United States Patent
Yuyama et al.

(10) Patent No.: US 7,957,929 B2
(45) Date of Patent: Jun. 7, 2011

(54) DRUG DISPENSING APPARATUS

(75) Inventors: Shoji Yuyama, Toyonaka (JP);
Masahiko Kasuya, Toyonaka (JP);
Akitomi Kohama, Toyonaka (JP);
Masatoshi Warashina, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 1454 days.

(21) Appl. No.: 10/574,915

(22) PCT Filed: Sep. 22, 2004

(86) PCT No.: PCT/JP2004/013834
§ 371 (c)(1),
(2), (4) Date: Apr. 7, 2006

(87) PCT Pub. No.: WO2005/038390
PCT Pub. Date: Apr. 28, 2005

(65) Prior Publication Data
US 2007/0129911 A1    Jun. 7, 2007

(30) Foreign Application Priority Data

Oct. 16, 2003 (JP) ................. 2003-357110
Apr. 12, 2004 (JP) ................. 2004-116876

(51) Int. Cl.
*G01D 1/00*     (2006.01)
*G06F 15/00*    (2006.01)
(52) U.S. Cl. .................................... 702/127
(58) Field of Classification Search .................. 702/127
See application file for complete search history.

(56) References Cited

U.S. PATENT DOCUMENTS 3,294,284 A * 12/1966 Chambers ................. 221/120
(Continued)

FOREIGN PATENT DOCUMENTS

EP    1 118 318    7/2001
(Continued)

OTHER PUBLICATIONS

Supplementary European Search Report (in English language) issued Apr. 24, 2009 in corresponding to European Patent Application No. 04788017.

(Continued)

*Primary Examiner* — Cindy Hien-Dieu Khuu
(74) *Attorney, Agent, or Firm* — Wenderoth, Lind & Ponack, L.L.P.

(57) ABSTRACT

A drug dispensing apparatus including a cassette for containing drugs in an aligned state, a rotor disposed at one open end of the cassette, a pushing unit for pushing the drugs toward the rotor, a drive mechanism for pivoting the rotor alternately between a dispensing position and a receiving position by operating a drive switch to dispense the drugs one-by-one, and a measuring unit for measuring the present quantity of the drugs in the cassette. The apparatus also includes a memory unit for storing a stock quantity $N_0$ of the drugs in the cassette. When the rotor is returned to the receiving position from the dispensing position, the present quantity N measured by the measuring unit is compared with the stock quantity $N_0$ stored in the memory unit. If the present quantity N is less than the stock quantity $N_0$, the present quantity N is stored in the memory unit as a stock quantity $N_0$, while if the present quantity N is same as the stock quantity $N_0$, it is informed that the drug has not been taken out.

7 Claims, 39 Drawing Sheets

U.S. PATENT DOCUMENTS

| | | |
|---|---|---|
| 4,014,741 A | 3/1977 | Foxworthy et al. |
| 6,181,982 B1 * | 1/2001 | Yuyama et al. ............... 700/236 |
| 6,364,517 B1 * | 4/2002 | Yuyama et al. ............... 700/231 |
| 7,592,553 B2 * | 9/2009 | Yuyama et al. ............ 177/25.13 |
| 2001/0008984 A1 * | 7/2001 | Omura et al. ................. 700/241 |
| 2003/0062388 A1 | 4/2003 | Yuyama et al. |
| 2003/0075553 A1 | 4/2003 | Amatsu et al. |
| 2006/0113314 A1 * | 6/2006 | Yuyama et al. ............... 221/222 |

FOREIGN PATENT DOCUMENTS

| | | |
|---|---|---|
| JP | 53-79558 | 7/1978 |
| JP | 58-66319 | 5/1983 |
| JP | 58-126045 | 7/1983 |
| JP | 5-86308 | 11/1993 |
| JP | 8-52051 | 2/1996 |
| JP | 2000-11072 | 1/2000 |
| JP | 2001-198192 | 7/2001 |
| JP | 2001-198193 | 7/2001 |
| JP | 2001-258993 | 9/2001 |
| JP | 2001-258994 | 9/2001 |
| JP | 2001-258997 | 9/2001 |
| JP | 2002-11075 | 1/2002 |
| JP | 2003-79701 | 3/2003 |

OTHER PUBLICATIONS

Chinese Office Action issued Apr. 11, 2008.
Chinese Office Action (in English language) issued Aug. 3, 2007.

* cited by examiner

Fig.7
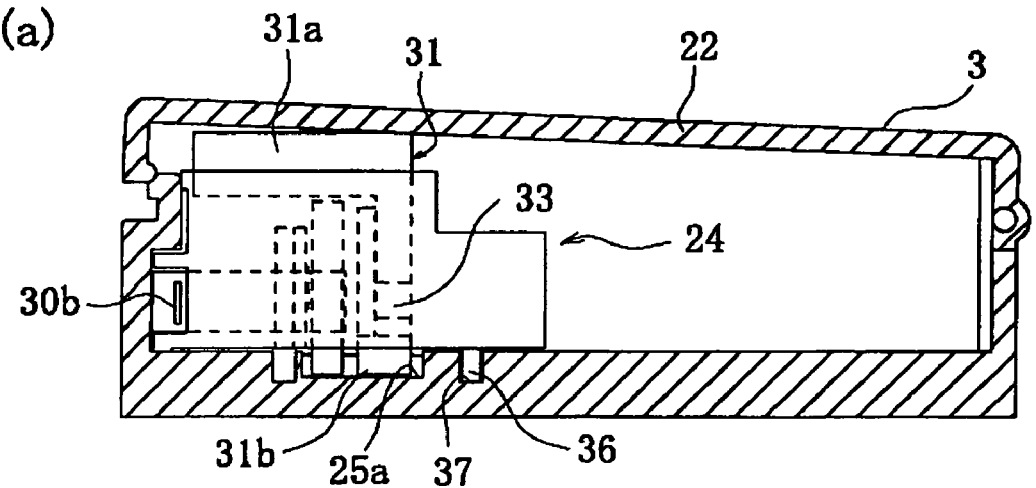
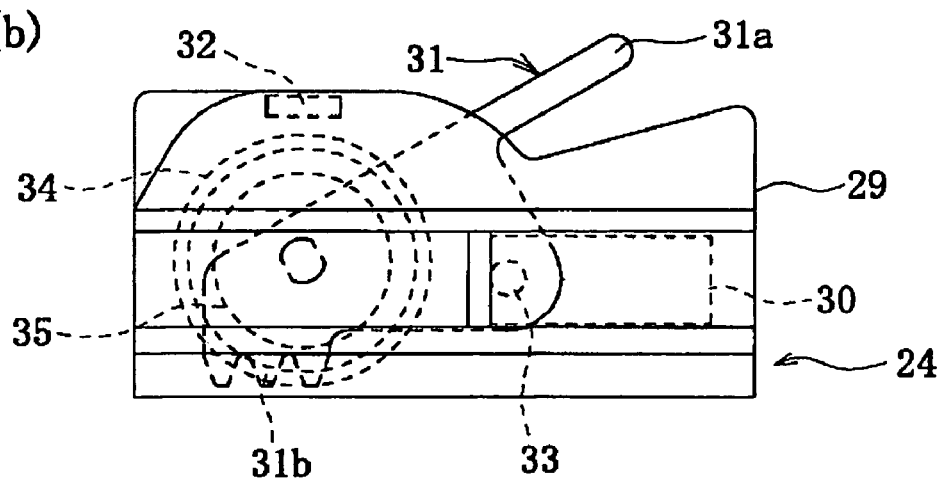
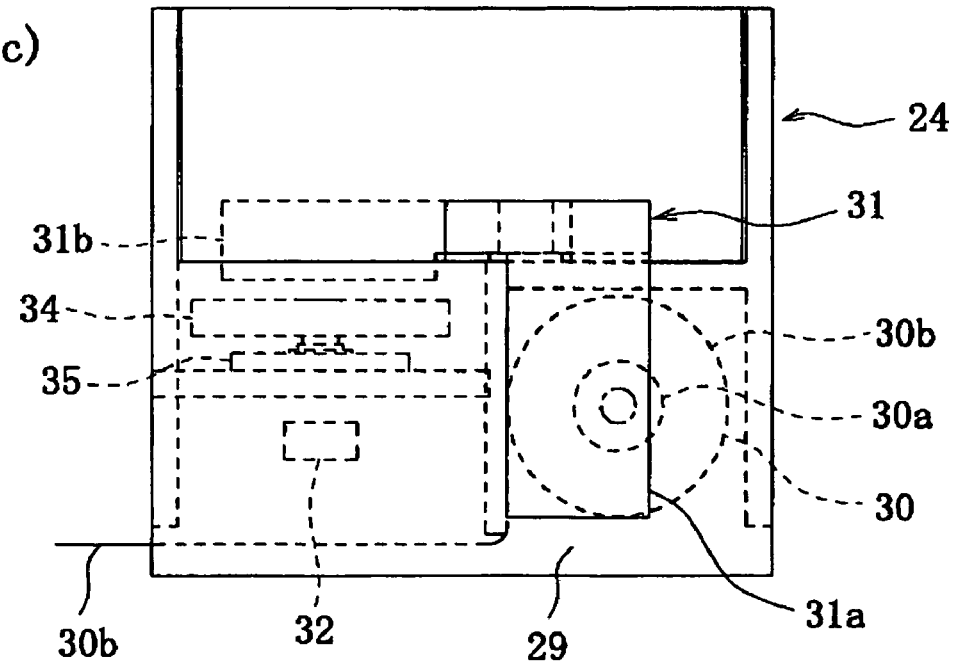

Fig.8
(a)
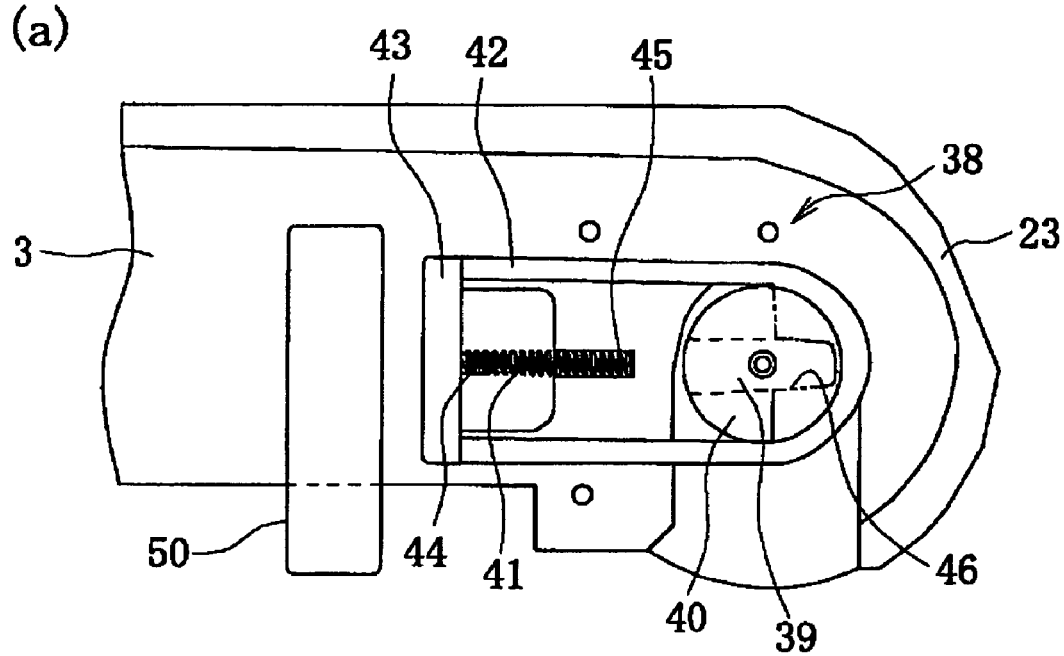
(b)
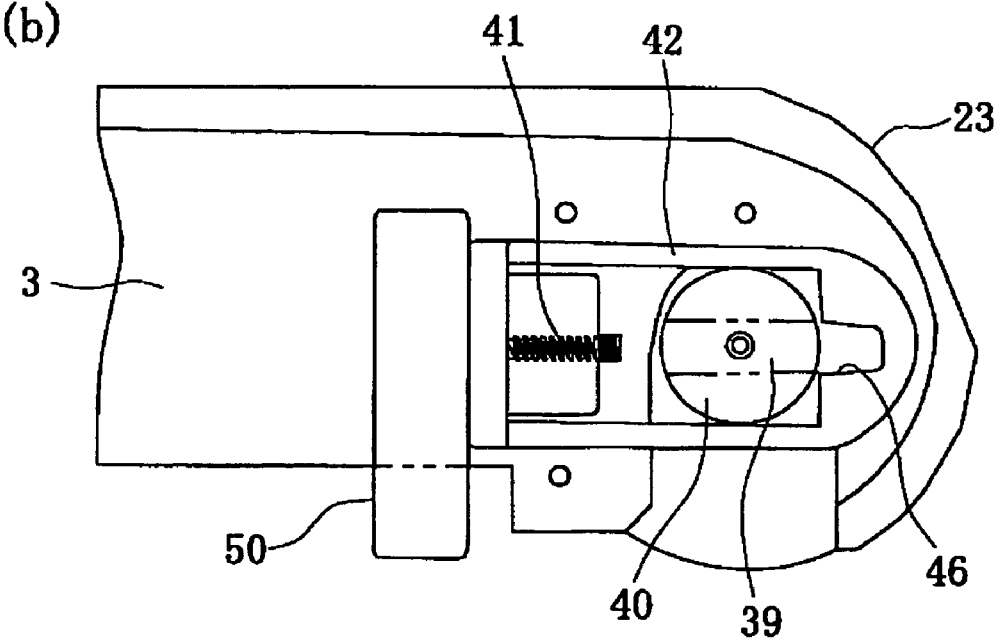

Fig.9
(a) 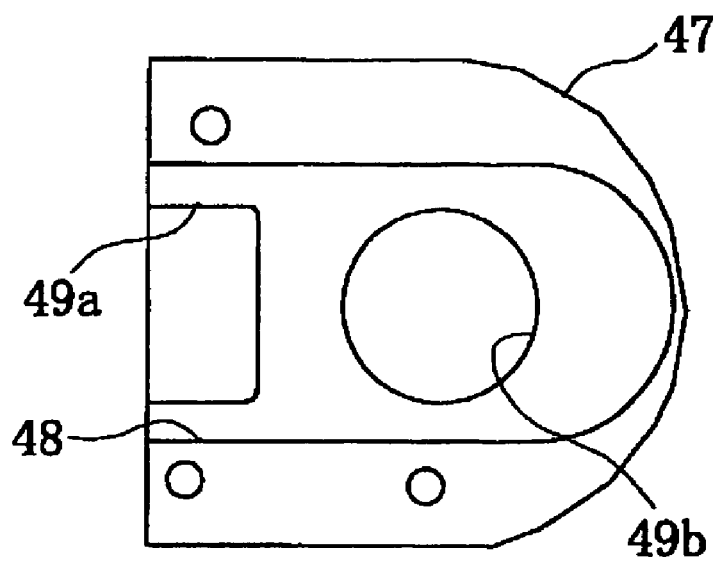
(b) 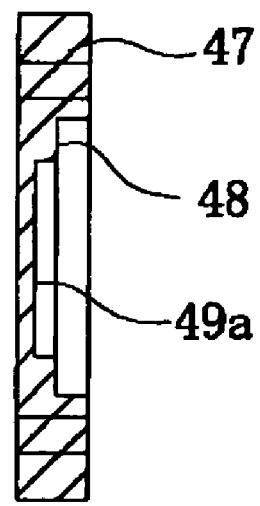

Fig.27

MAINTENANCE SCREEN OF DRUG REGISTRATION IN SECUILL SYSTEM

MAINTENANCE SCREEN OF DRUG REGISTRATION

CASSETTE NO. 023    DRUG NAME: PAM INJECTION DRUG

DATA WERE CORRECTLY UPDATED.
DO YOU CONTINUE DRUG REGISTRATION
MAINTENANCE?

CONTINUATION BUTTON

MEASURED VALUE     SET QUANTITY

FIRST REFERENCE LENGTH    0.35    1

SECOND REFERENCE LENGTH    4.86    24

Fig.28

| NUMBER OF DRUGS | CALCULATED Pmin | CALCULATED Pmax |
|---|---|---|
| 0 | 0 | 0.09525 |
| 1 | 0.1905 | 0.28575 |
| 2 | 0.381 | 0.47625 |
| 3 | 0.5715 | 0.66675 |
| 4 | 0.762 | 0.85725 |
| 5 | 0.9525 | 1.04775 |
| 6 | 1.143 | 1.23825 |
| 7 | 1.3335 | 1.42875 |
| 8 | 1.524 | 1.61925 |
| 9 | 1.7145 | 1.80975 |
| 10 | 1.905 | 2.00025 |
| 11 | 2.0955 | 2.19075 |
| 12 | 2.286 | 2.38125 |
| 13 | 2.4765 | 2.57175 |
| 14 | 2.667 | 2.76225 |
| 15 | 2.8575 | 2.95275 |
| 16 | 3.048 | 3.14325 |
| 17 | 3.2385 | 3.33375 |
| 18 | 3.429 | 3.52425 |
| 19 | 3.6195 | 3.71475 |
| 20 | 3.81 | 3.90525 |
| 21 | 4.0005 | 4.09575 |
| 22 | 4.191 | 4.28625 |
| 23 | 4.3815 | 4.47675 |
| 24 | 4.572 | 4.66725 |
| 25 | 4.7625 | 4.85775 |

Fig.33
(a)
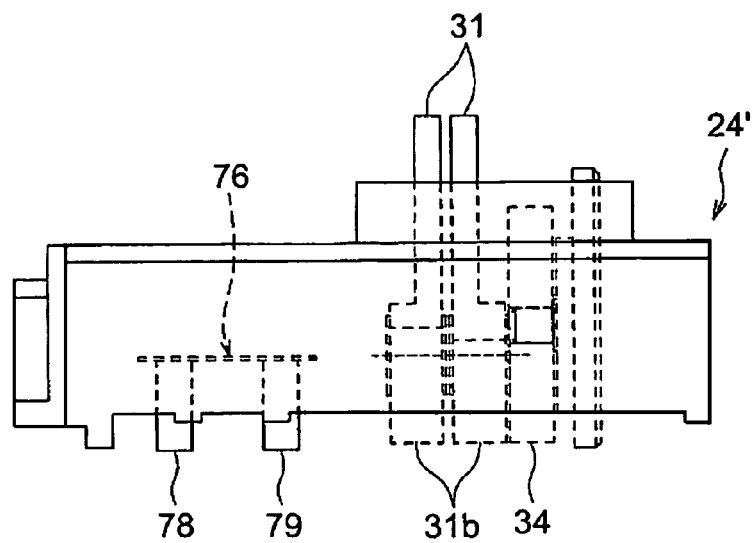
(b)
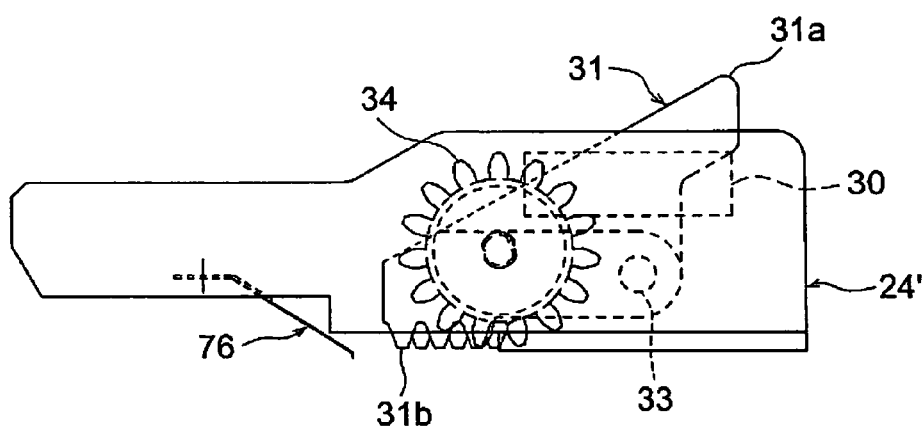
(c)
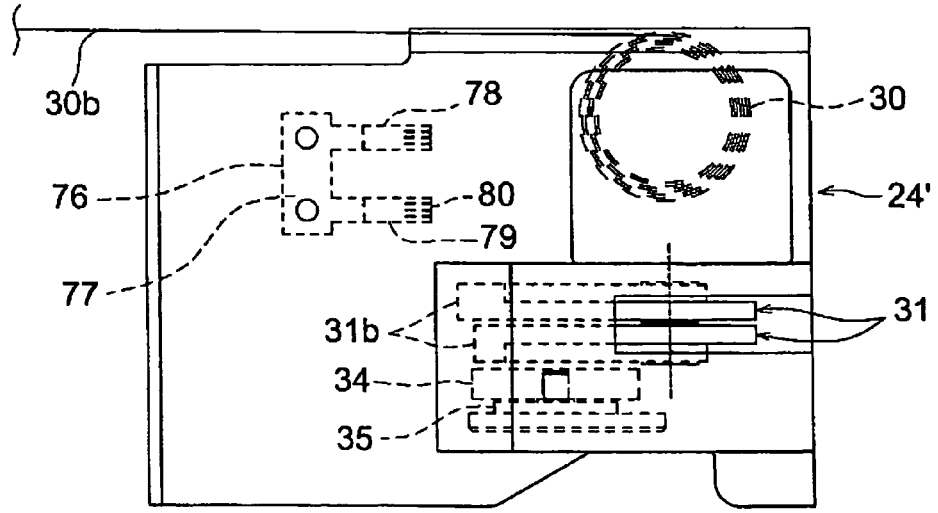

DRUG DISPENSING APPARATUS

BACKGROUND OF THE INVENTION

1. Technical Field

The present invention relates to a drug dispensing apparatus for dispensing drugs contained in a cassette one by one, more specifically to a drug dispensing apparatus in which present quantity of the drugs contained in the cassette can be measured to confirm that the drugs has been taken out or forgotten to take out.

2. Description of the Related Art

When the present quantity of drugs (injection drugs such as ampoules or vials) arranged in a row and contained inside a cassette of a drug dispensing apparatus is counted, proximity sensors or light-receiving sensors of a light reflection type are disposed with the same pitch as the drug arrangement pitch and the number of sensors that detected the drug is taken as the present quantity of drugs (see, for example, patent documents 1, 2).

Furthermore, it was also suggested to print a scale with a spacing corresponding to an ampoule pitch on a belt (Conston) impelling ampoules located inside the cassette in one direction toward the outlet opening and visually determining the remaining number of ampoules by reading the scale (patent document 3).

It was also suggested to provide a weight for impelling the ampoules unidirectionally toward the outlet opening of a cassette, provide a sensor in one location of the route, and detect the decrease in the number of ampoules (patent documents 4-8). According to another suggestion, the amount of ampoules is measured by image recognition using a CCD camera (patent document 9).

Patent document 1: JP 2000-11072A
Patent document 2: JP 2001-258997A
Patent document 3: JP 2003-79701A
Patent document 4: JP 2001-258993A
Patent document 5: JP U5-86308A
Patent document 6: JP 2002-11075A
Patent document 7: JP 2001-258994A
Patent document 8: JP 2001-198193A
Patent document 9: JP 2001-198192A

SUMMARY OF THE INVENTION

However, in the apparatuses described in the patent documents 4, 6, because the sensor pitch has to be changed according to the ampoules of various types with different diameters, assembling and mass production were prohibited by a high cost.

In the apparatus described in the patent document 2, a belt scale was printed for each type of ampoules with different diameters. As a result, a large number of special plates were necessary.

In the apparatuses described in the patent documents 1, 3, 5, 7, 9, even if the decrease in the quantity of ampoules can be detected, the present quantity thereof cannot be detected and storage management is difficult.

Detection of the quantity of drugs by image recognition described in the patent document 8 is free from the above-described drawbacks, but it is costly and not suitable for practical use.

The present invention was created with the above-described problems in view, and it is an object of the present invention to provide a drug dispensing apparatus capable of measuring the present quantity of drugs arranged in a row, regardless of the their size or type, to confirm that the drugs has been taken out or forgotten to take out.

To resolve the above-described problems, the first invention provides a drug dispensing apparatus comprising a cassette for containing drugs in an aligned state. a rotor disposed at one open end of the cassette, a pushing unit for pushing the drugs toward the rotor, a drive mechanism for pivoting the rotor alternately between a dispensing position and a receiving position by operating a drive switch to dispense the drugs one by one, and a measuring unit for measuring the present quantity of the drugs in the cassette, characterized in that:

a memory unit for storing a stock quantity $N_0$ of the drugs in the cassette is further provided; and wherein when the rotor is returned to the receiving position from the dispensing position, the present quantity N measured by the measuring unit is compared with the stock quantity $N_0$ stored in the memory unit, wherein if the present quantity N is less than the stock quantity $N_0$, the present quantity N is stored in the memory unit as a stock quantity $N_0$, while if the present quantity N is same as the stock quantity $N_0$, it is informed that the drug has been forgotten to take out.

In accordance with the second invention. the measuring unit comprises:

a constant voltage source;

a resistance circuit comprising a plurality of resistors connected in series, in which the resistor at one end is connected to the constant voltage source and the resistor at the other end is connected to the ground;

a detection circuit comprising a plurality of switches that are disposed with uniform spacing along the drugs and have one end thereof connected between the adjacent resistors and the other end thereof connected to a detection terminal;

switch drive means provided at the pushing unit and serving to turn the switch on;

measurement means for measuring a voltage in the detection terminal of the detection circuit; and computation means for computing the present quantity of the drugs based on the voltage measured by the measurement means.

The term "constant voltage source" includes a DC constant voltage source and a constant voltage AC source (AVR). The arrangement of "resistors" includes not only the arrangement with a constant spacing, but also an arrangement according to the prescribed order.

In accordance with the third invention, in the second invention, the detection circuit comprises three parallel circuits connected alternately to the switches.

In accordance with the fourth invention, in the third invention, every other switch is removed.

In accordance with the fifth invention, in the second to fourth invention, the switches are disposed equidistantly in the circumferential direction and the measurement of an elongated object in the form of a circular arc is made possible.

In accordance with the sixth invention, in the first invention, the measuring unit comprises:

a constant voltage source;

a resistance circuit comprising a linear resistor disposed along the drugs and having one end thereof connected to the constant voltage source and the other end thereof connected to the ground, a detection circuit comprising an electrically conductive sliding member disposed at the second reference member and having one end thereof in sliding contact with the resistor and the other end thereof connected to a detection terminal, measurement means for measuring a voltage in the detection terminal of the detection circuit, and computation means for computing the present quantity N of the drugs based on the voltage measured by the measurement means.

In accordance with the seventh invention, in the second or sixth invention, the computation means computes the difference between a first measurement value obtained by the measurement means when a drug of a first reference length is disposed and a second measurement value obtained by the measurement means when a drug of a second reference length is disposed, computes the ratio of the difference between the first measurement value and second measurement value to the difference between the first reference length and second reference length, and computes the present quantity of the drugs to be measured, from the measurement value obtained by the measurement means when the drug is disposed and from the ratio.

Here, "the first reference length" is not limited to one elongated object that is to be detected and may relate to several objects. "The second reference length" may be different from the first reference length and the number thereof is not limited.

The effect attained in accordance with the present invention is that the present quantity of drugs arranged in a row can be measured regardless of their size or type to confirm that the drugs has been taken out or forgotten to take out.

BRIEF DESCRIPTION OF THE DRAWINGS

FIG. 7A is a cross-sectional view of a cassette having a pushing unit; FIG. 7B is a side view of the pushing unit, and FIG. 7C is a plan view of the pushing unit;

FIG. 8A is a left side view of the front end position of the cassette illustrating the locked state of the locking mechanism of the rotor, and FIG. 8B is a left side view of the front end position of the cassette illustrating the unlocked state;

FIG. 9A is a plan view of the cover attached to the cassette, FIG. 9B is a cross-sectional view of the cover shown in FIG. 9A;

FIG. 27 is a front view illustrating the maintenance screen of the measurement apparatus following FIG. 26;

FIG. 28 is a table illustrating the data of measurement values;

FIG. 33 is a pushing unit of the cassette shown in FIG. 30, FIG. 33A is a front view, FIG. 33B is a plan view, and FIG. 33C is a side view;

Figure 1:
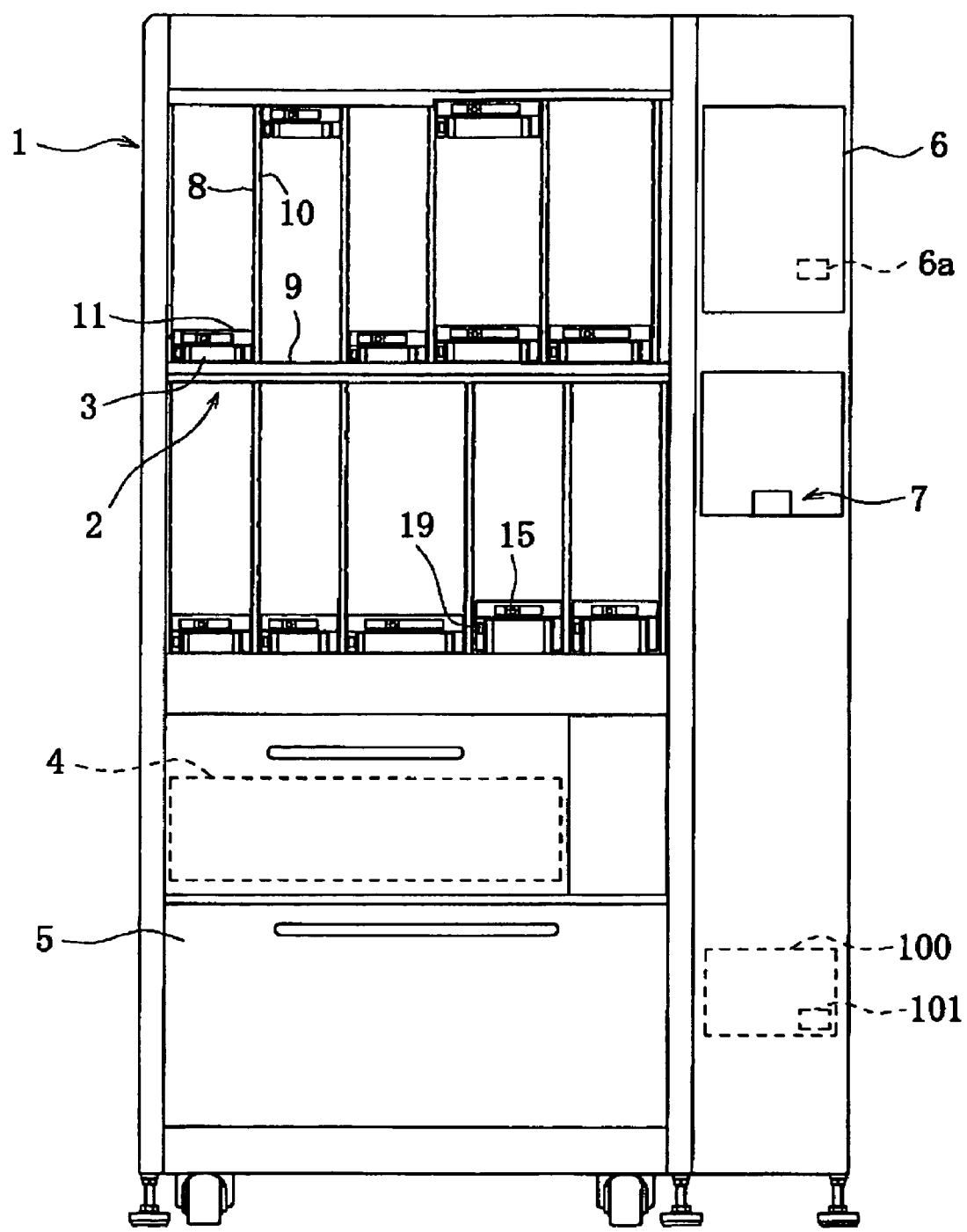
FIG. 1 is a schematic front view of a drug dispensing apparatus of an embodiment of the present invention.

EXPLANATION OF THE REFERENCE NUMERALS 14 reed switch
23 rotor
24 pushing unit
32 magnet (switch drive means)
100 control unit (measuring means)
100 control unit (computing means)

DETAILED DESCRIPTION OF THE INVENTION

Hereinafter, embodiments of the present invention will be described with reference to the accompanying drawings.

FIG. 1 shows a drug dispensing apparatus according to the present embodiment comprising an elongated object measurement device. A storage shelf 2 is provided at a frame body 1 of the drug dispensing apparatus, a plurality of cassettes 3 are arranged side by side in the horizontal direction in the storage shelf 2 and disposed in multiple stages in the vertical direction. A printer 4 for releasing a paper sheet having an injection label containing the name, quantity, etc. of the dispensed drug is disposed below the storage shelf 2, an accommodation section 5 that accommodates the drug boxes or the like is provided below the printer 4. An operation and display panel 6 is provided on the front surface on the right side of the storage shelf 2, enabling the prescribed input and display. A user authentication device 7 verifying the fingerprint of an operator and checking whether the operator is an authorized person is provided below the control panel 6. A door or a shutter is provided on the front surface of the storage shelf 2. If necessary, it is cooled and maintained at the prescribed temperature. Furthermore, the reference numeral 100 stands for a control unit of the drug dispensing apparatus; it includes a memory unit 101.

The storage shelf 2 comprises a plurality of vertical plates 8 and horizontal plates 9. The spacing between the adjacent vertical plates 8 is set according to the size of the cassettes 3 to be contained therein. Multiple stages of support grooves 10 are formed in the up-down direction on the side surface of each vertical plate 8. Accommodation members 11 for retaining the cassettes 3 are supported by the opposing support grooves 10. The spacing between the support grooves 10 that are adjacent in the vertical direction is set according to the size of the cassettes 3 to be contained therein.

Figure 2:
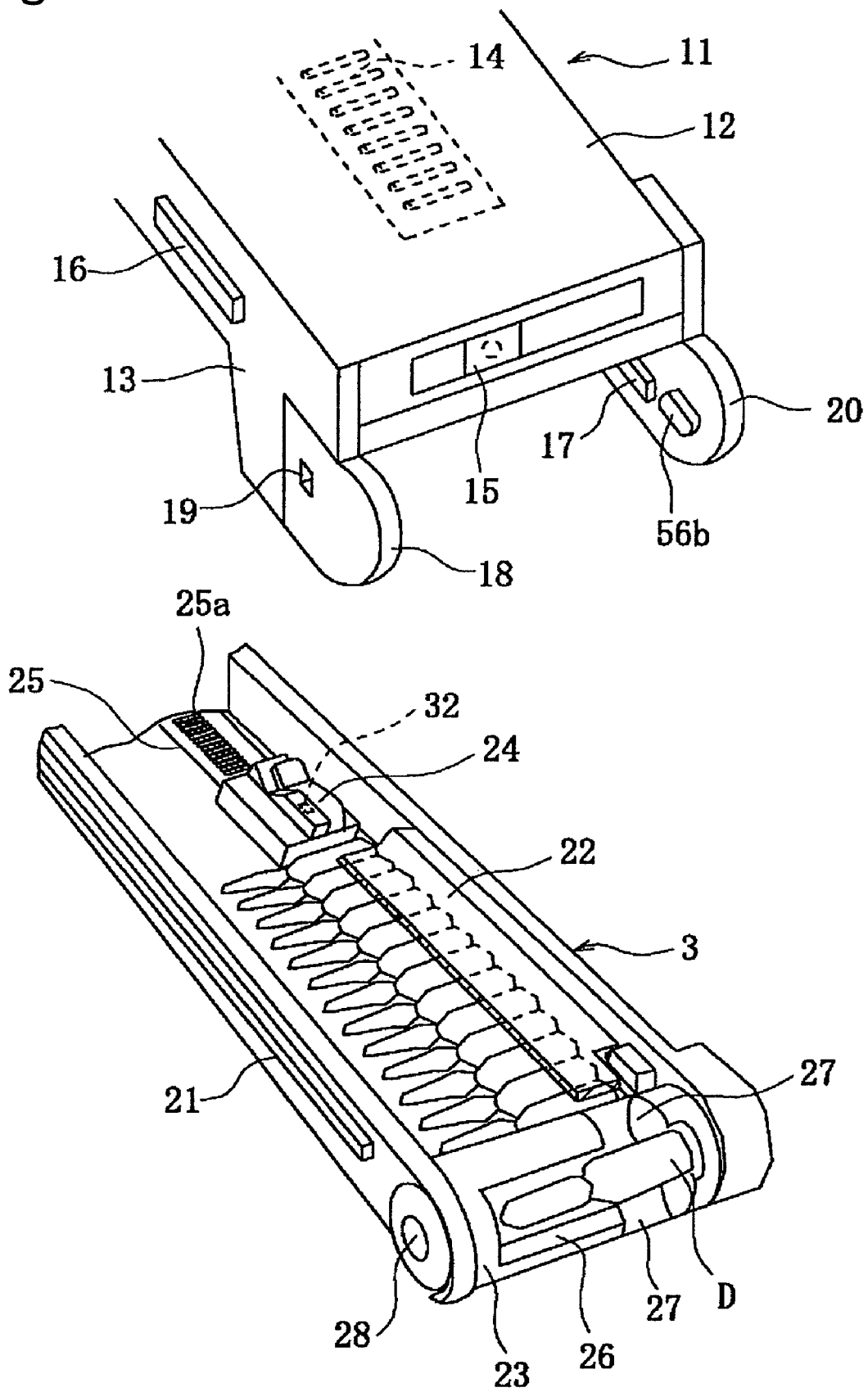
FIG. 2 is a partial perspective view illustrating an example of the holding member and cassette shown in FIG. 1.

The accommodation member 11, as shown in FIG. 2 comprises a shelf plate 12 and side plates 13 extending downward from both side ends of the shelf plate 12. Multiple reed switches 14 serving as detection means in accordance with the present invention for detecting the quantity of drugs in the cassette 3 are installed with a constant spacing at the lower surface of the shelf plate 12. A drive switch 15 is provided at the end surface on the front surface side of the shelf plate 12. Protrusions 16 to be engaged and locked in the support grooves 10 of the vertical plates 8 of the storage shelf 2 are formed on the outer surfaces of each side plate 13, and support sections 17 that can be slidably engaged with the below-described guide sections 21 of the cassette 3 are formed at the inner surface of the side plates. A protruding section 18 composed of a semicircular transparent member is attached to the front end of the left side plate 13. A display device 19 comprising a light-emitting diode is embedded as display means in accordance with the present invention in the protruding section 18. A semicircular protruding section 20 is also provided at the front end of the right side plate 13. A drive mechanism 51 (see FIG. 10) for driving the below-described rotor 23 of the cassette 3 is accommodated in this protruding section 20.

As shown in FIG. 2, the cassette 3 has a box-like shape open at the front and at the top, and guide sections 21 extending lengthwise for engaging with the support sections 17 of the accommodation member 11 are formed at the side surfaces of the cassette. Furthermore, a lid body 22 for covering the top open portion is rotatably provided at the cassette 3. A rotor 23, which is the dispensing member in accordance with the present invention, is provided at the open end section at the front side of the cassette 3 and drugs D can be dispensed one by one. The drugs D located inside the cassette 3 are contained in an arranged state and are pushed to the front surface side with a pushing unit 24, which is the pushing means in accordance with the present invention. A locking rack 25 is formed in the lengthwise direction at the bottom surface inside the cassette 3. The locking rack 25 is composed of a plurality of transverse elongated concave sections 25a provided with a prescribed pitch in the lengthwise direction.

Figure 3:
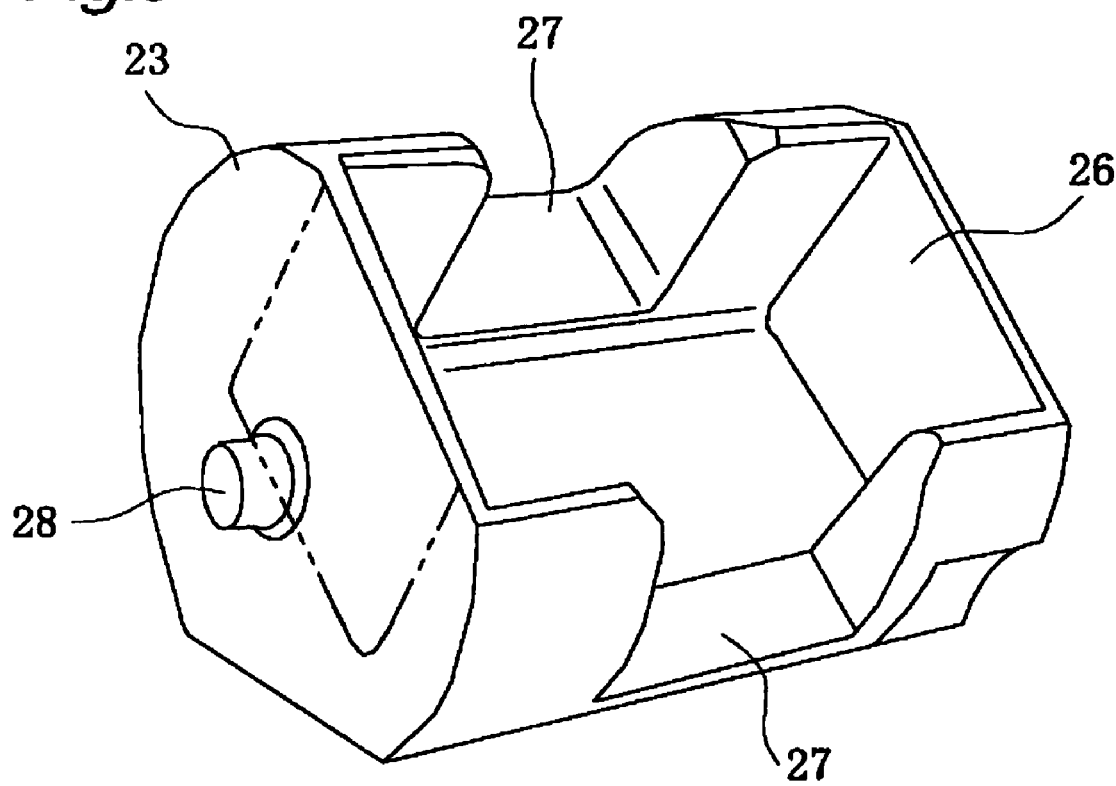
FIG. 3 is a perspective view illustrating a rotor that can be employed in the cassette shown in FIG. 1.
Figure 4:
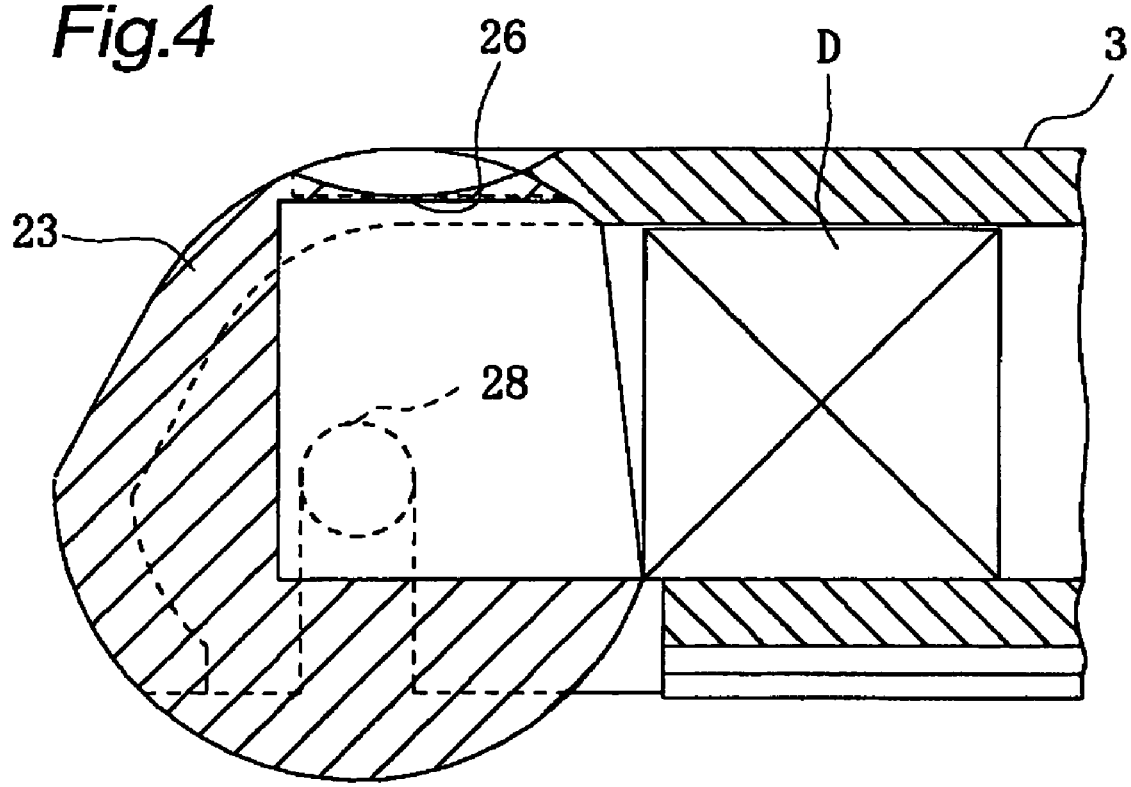
FIG. 4 is a cross-sectional view illustrating a rotor that can be employed in the cassette shown in FIG. 1.
Figure 5:
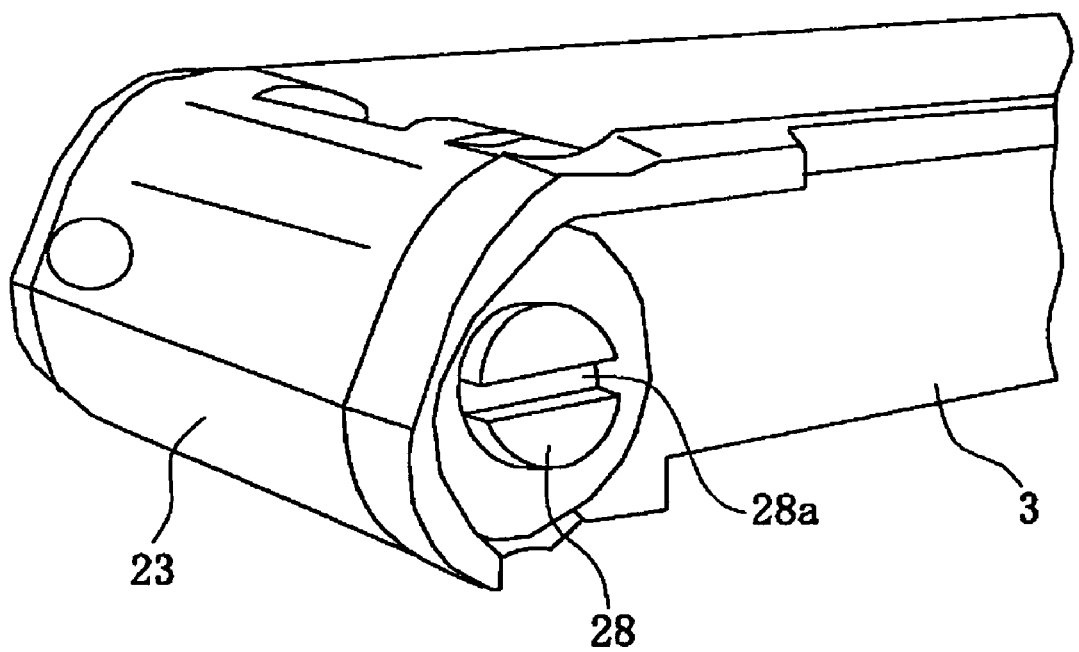
FIG. 5 is a partial perspective view, as viewed at an angle from the right side of the cassette.
Figure 6:
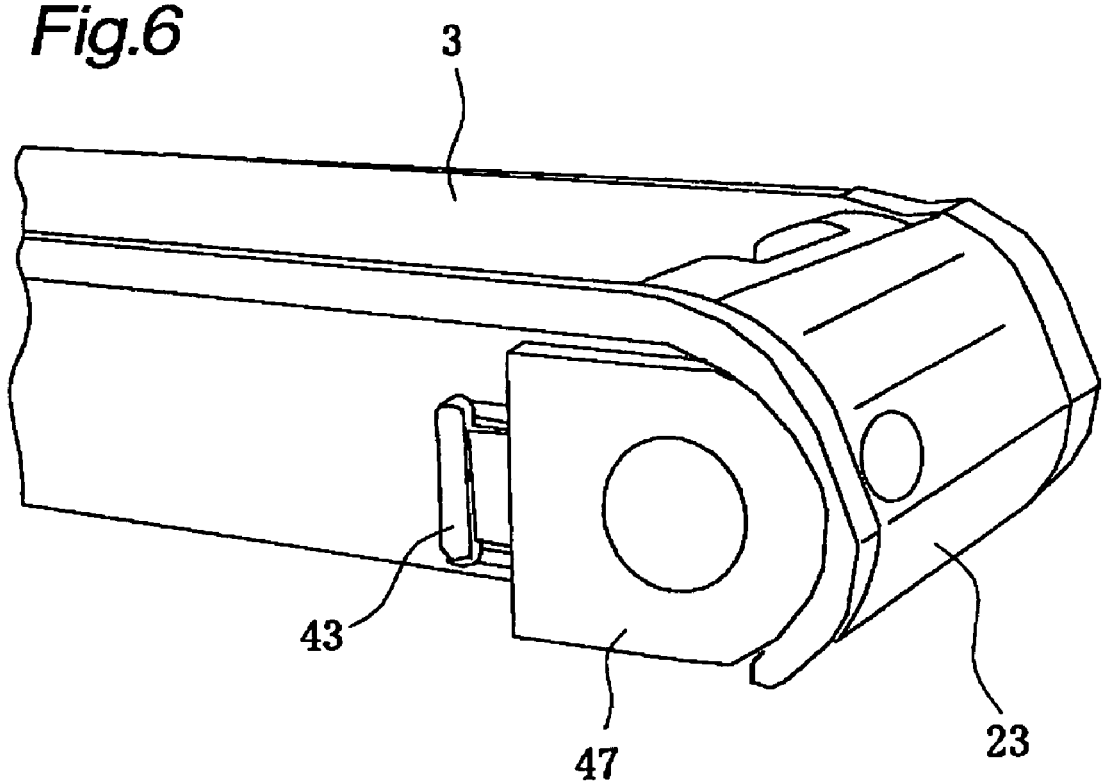
FIG. 6 is a partial perspective view, as viewed at an angle from the left side of the cassette.

A small rotor for withdrawing ampoules or the like, as shown in FIG. 2, or a larger rotor for withdrawing bottles containing vial bottles, as shown in FIG. 3 and FIG. 4, can be used at the rotor 23. As shown in FIG. 3, those rotors 23 comprise a holding concave section 26 for holding a drug D. Notches 27 are formed at both side surfaces constituting the holding concave section 26, thereby making it easier to take out the drug D. A shaft 28 protrudes from and is rotatably supported by the cassette 3 in the central sections of the end surfaces of the rotor 23. In a view from the front surface of the rotor 23, an engagement concave section 28a is formed, as shown in FIG. 5, at the end surface of the shaft 28 on the right side, and this engagement concave section 28a is engaged with an engagement convex section 56b of a drive mechanism 51 (see FIG. 10).

As shown in FIG. 7A to FIG. 7C, in the pushing unit 24, a constant load spring 30, a locking member 31, and a magnet 32 serving as the drug quantity detection means in accordance with the present invention are contained in a casing 29. One end surface of the casing 29 is in contact with the drug D contained in the cassette 3. The constant load spring 30 comprises a drum 30a and a spring section 30b in which a long strip is wound around the drum 30a. If the distal end of the spring section 30b is pulled out, it will return to the original state by a constant force. A commercially available Conston (registered trade mark) is used as the contact load spring. The distal end of the spring section 30b of the constant load spring 30 is pulled out from the casing 29, installed along the side wall of the cassette, and fixed to the front end side of the cassette 3. The locking member 31 is provided so that it can rotate about a spindle 33. A control section 31a at one end thereof protrudes from the upper surface of the casing 29 and pulled if the lid body 22 is closed. Furthermore, a gear section 31b is formed at the other end of the locking member 31, and this gear section can be engaged with the concave sections 25a of the locking rack 25 and disengaged therefrom. In the locking member 31, the gear section 31b is heavier than the spindle 33, and this gear section 31b is engaged with the locking rack 25 under gravity (it goes without saying that it may be impelled in the engagement direction with impelling means such as a spring). An auxiliary gear 34 and an oil damper 35 are rotatably provided on the other side of the gear section 31b of the locking member 31. The auxiliary gear 34 is engaged with the concave sections 25a of the locking rack 25 similarly to the locking member 31, such that a load is provided by the action of the oil damper 35 during the rotation. As a result, when the lid body 22 is closed after the cassette 3 has been filled with the drug D, the occurrence of undesirable effects can be avoided, e.g., the pushing unit 24 can be prevented from moving rapidly and hitting the contained drug D. Furthermore, the reference numeral 36 stands for a guide for stabilizing the operation of the pushing unit 24 by sliding in a guide groove 37 formed in the lengthwise direction of the inner bottom surface of the cassette 3. The magnet 32 is installed on the inner side of the top surface of the casing and faces the reed switch 14 of the accommodation member 11.

FIG. 8 and FIG. 9 show a lock mechanism 38 for preventing the rotation of rotor 23 when the cassette 3 is removed. A disk 40 having a guide protrusion 39 formed therein is provided at the shaft 28 of the rotor 23. A lock frame 42 impelled to the left (as shown in the figure) by a spring 41 is provided around the shaft 28. A projection 44 protruding toward the inner surface side is formed in the pushing section 43 at one end side of the lock frame 42, and the spring 41 is retained by this projection 44 and inside a groove 45 formed in the side surface of the cassette 3. Furthermore, an engagement groove 46 that can be engaged with the guide protrusion 39 of the disk 40 and disengaged therefrom is formed in the other end section of the lock frame 42. The spring 41 and lock frame 42 are covered, except for the pushing section 43, with a cover 47 fixed to the cassette 3. A slide groove 48 in which the lock frame 42 can slide, a first escape concave section 49a in which the pushing section 43 can slide, and a second escape concave section 49b where the disk 40 can rotate are formed in the cover 47. An abutment section 50 against which the pushing section 43 of the lock frame 42 abuts when the cassette 3 is installed is formed in the side surface of the accommodation section 3.

Figure 10:
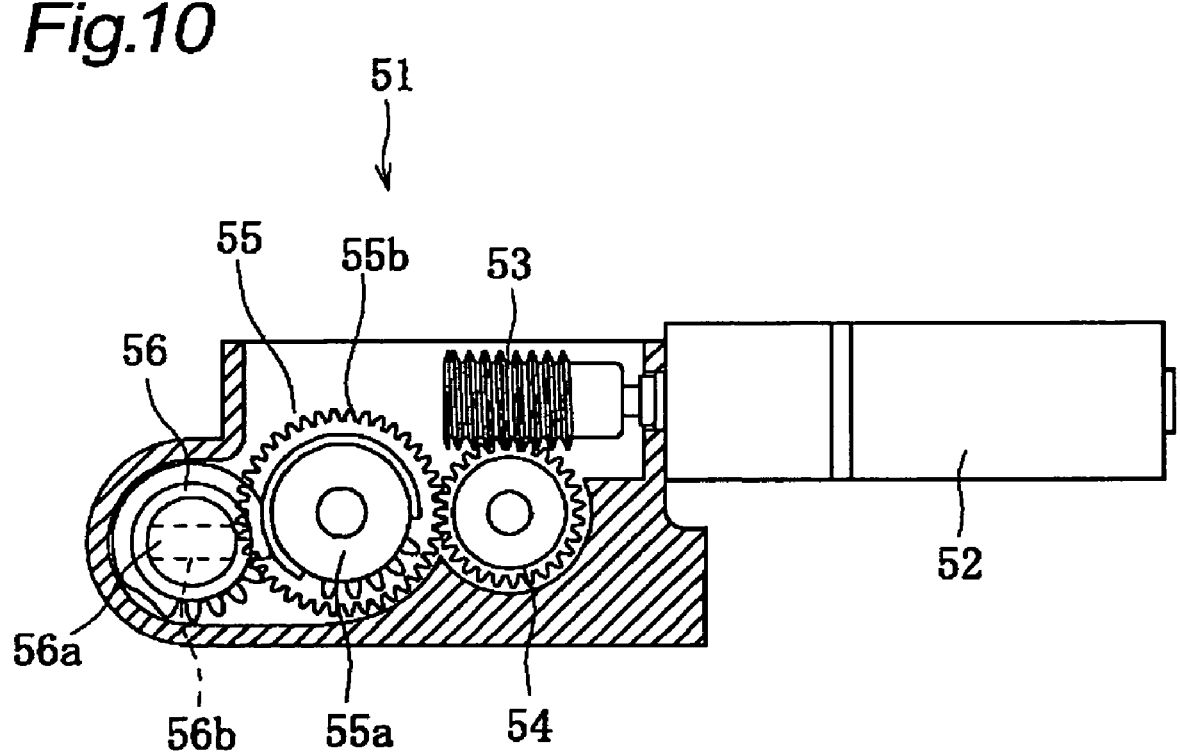
FIG. 10 is a plan cross-sectional view of a rotary drive mechanism of the rotor.

As shown in FIG. 10, the drive mechanism 51 comprises a motor 52, a worm gear 53, a worm wheel 54, an intermediate gear 55, and a drive gear 56. The worm gear 53 is fixed to the rotations haft of the motor 52, and the worm wheel 54 is engaged with the worm gear 53. In the intermediate gear 55, a segment gear 55a and a plain gear 55b are integrated, the plain gear 55b is engaged with the worm wheel 54, and the segment gear 55a can be engaged with the drive gear 56. A segment gear is used for the drive gear 56, a rectangular engagement convex section 56b protruding inwardly from the protruding section 20 is formed at the distal end surface of the drive shaft 56a for engagement with the engagement concave section 28a of the shaft 28 of the rotor 23.

If the motor 52 is driven forwardly or reversely, the drive force is transmitted to the drive gear 56 via the worm gear 53, worm wheel 54, and intermediate gear 55, and then transferred to the rotor 23 via the engagement of the engagement convex section 56b and the engagement concave section 28a of the shaft 28 of the rotor 23. As a result, the drugs D contained in the cassette 3 are successively dispensed by rotating the rotor 23 alternately to the dispensing position and receiving position. In this case, if the rotor 23 is rotated to the prescribed position, the teeth of the segment gear 55a of the intermediate gear 55 and the teeth of the drive gear 56 are not engaged and further rotation is prevented. Therefore, it is not necessary to control accurately the drive time of the motor 52, and the rotor 23 can be reliably positioned with the dispensing position and receiving position.

Figure 11:
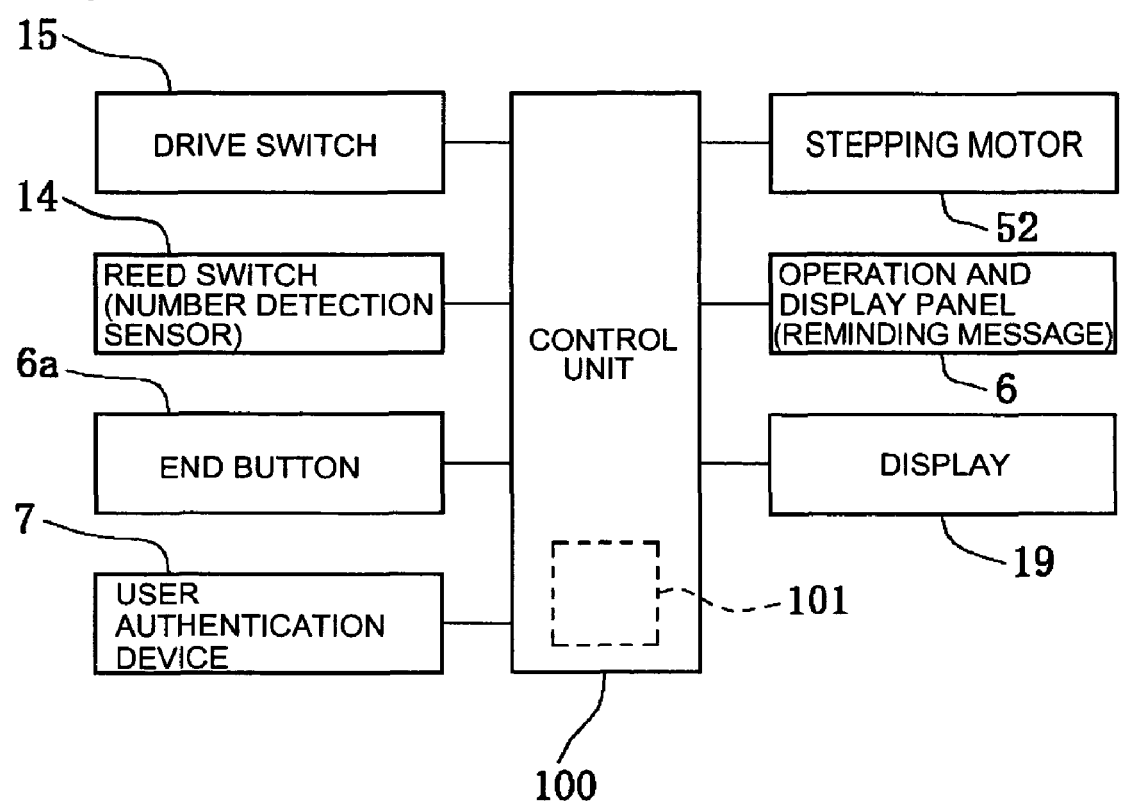
FIG. 11 is a block diagram of the drug dispensing apparatus of the an embodiment of the present invention.

As shown in FIG. 11, input signals from the drive switch 15, the reed switch 14, and an end button 6a of the operation and display panel 6 or prescription data and other input signal from the user authentication device 7 are inputted into a control unit 100. The control unit 100 drive controls a stepping motor 55 etc. based on the input signal. A variety of authentication means such as the user ID and password, user authentication, iris authentication, etc., can be employed as the user authentication device 7. The stepping motor 55 etc. can be driven and the drug D can be taken out only when a person having a pre-registered drug dispensing authorization has been identified.

Figure 12:
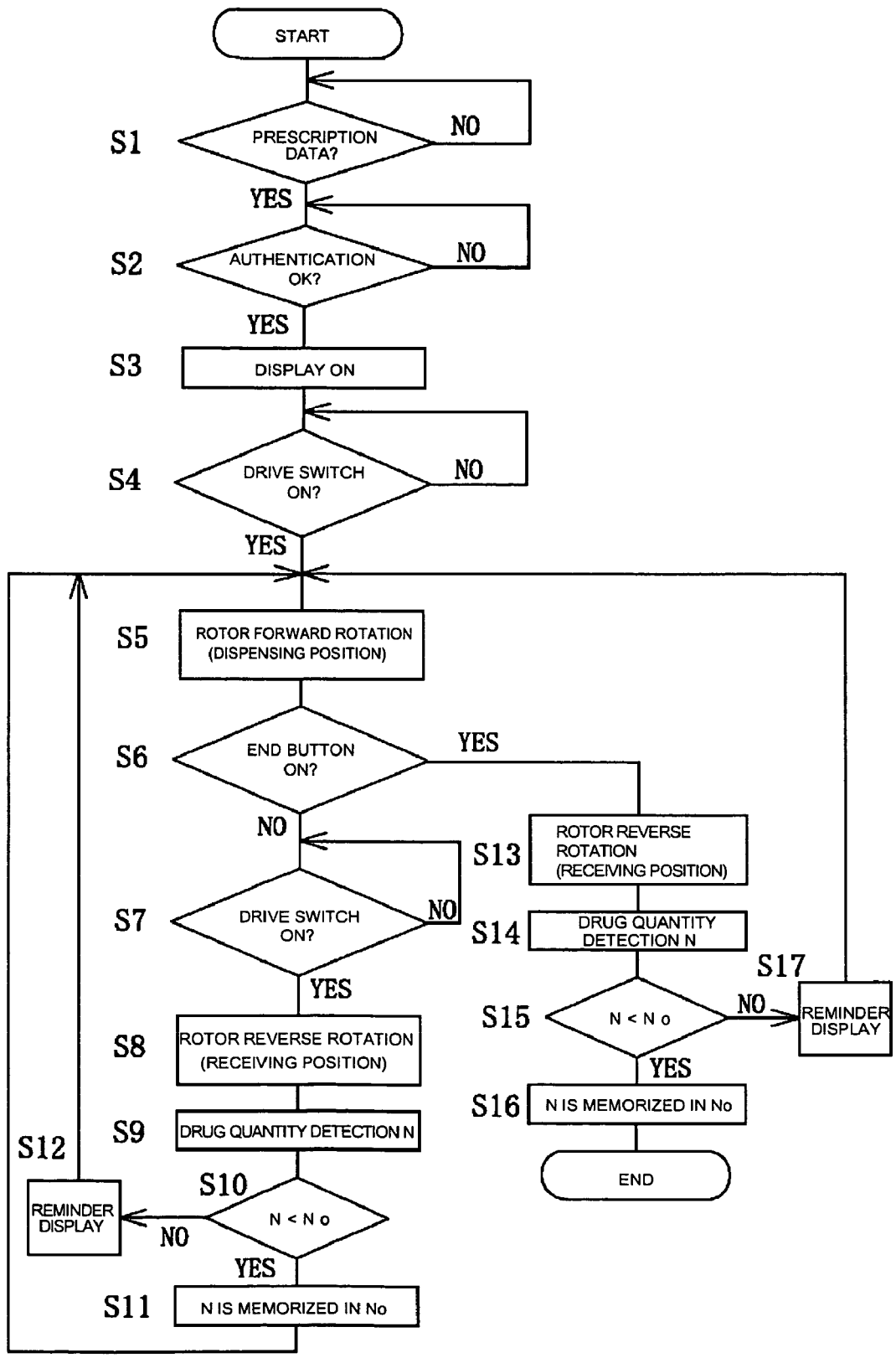
FIG. 12 is a flowchart illustrating the processing contents of the drug dispensing apparatus of the an embodiment of the present invention.

Operation of the drug dispensing apparatus of the above-described configuration will be explained below in accordance with the flowchart shown in FIG. 12.

In the drug dispensing apparatus, drugs D are contained inside each cassette 3 in a state where they are arranged in one row. In this state, the pushing force of the constant load spring 30 acts upon the contained drugs D via the pushing unit 24, and the drug D position in the frontmost section is held in the holding concave section 26 of the rotor 23 located in the receiving position.

If the prescription data is inputted (step S1) and adequate authentication is carried out by the user authentication device 7 (step S2), then the control unit 100 displays the cassette 3 containing the corresponding drug D by turning on or off the display 19 (step S3). More specifically, a blue light comes on at the display 19 when one drug D is to be dispensed, the blue light is turned off when a plurality of drugs D are being dispensed, upon completion of the dispensing this light comes on, an orange light is turned off when there is a cassette error (the rotor cannot be rotated), and the orange light comes on when the drug is missing or the quantity thereof is small. Furthermore, if the drive switch 15 is switched on (step S4), the rotor 23 is rotated forwardly by the drive mechanism 51 and stopped in the take-out position (step S5). As a result, the authorized operator can take out the drug D located in the holding concave section 26 of the rotor 36 located in the take-out position.

If the quantity of drugs requested by the prescription data has been taken out, the operator pushes the end button 6a of the operation and display panel 6, but if the operation has not ended, the operator pushes a drive switch 15 to take out the next drug. Assuming that the operation of taking out a drug has not ended, the control unit 100 waits for a fixed time and if the end button 6a is not pushed ON (step S6) and the drive switch 15 is switched on (step S7), then the rotor 23 is reversed with the drive mechanism 51 and stopped in the receiving position (step S8). As a result, the drug located in the head section of the drugs pushed by the pushing unit 24 is received by the holding concave section 26 of the rotor 23. Here, the present quantity N of drugs in the cassette 3 is detected with the magnet 32 of the pushing unit 24 and the reed switch 14, which are the detection means (step S9). More specifically, the present quantity N of drugs arranged in a row between the pushing unit 24 and the holding concave section 26 of the rotor 23 is computed from the position of the reed switch 14 turned on by approach to the magnet 32 of the pushing unit 24, of a plurality of reed switches 14 provided in the positions corresponding to drugs D arranged in a row in the cassette 3. Then, it is determined whether or not the present quantity N is less than the stock quantity No memorized by the memory unit 101 (step S10), and if the present quantity is less than the stock quantity, the present quantity N is memorized as a stock quantity $N_0$ in the memory unit 101 (step S11), the processing flow returns to step S5, and the drug dispensing operation is repeated. Furthermore, if the present quantity N is equal to the stock quantity $N_0$, the message reminding that the drug has been forgotten to take out is displayed on the operation and display panel 6 (step S12), the processing flow then returns to step S5, and the drug dispensing operation is repeated.

If the operation of taking out the drug is completed and the operator pushes the end button 6a of the operation and display panel 6, the control unit 100 causes the drive mechanism 51 to reverse the rotation of the rotor 23 and stop it in the receiving position (step S13). As a result, a drug can be received in the holding concave section 26 of the rotor 23. Here, in the same, manner as described above, the present quantity N of the drugs in the cassette 3 is detected (step S9), it is determined whether or not the present quantity N is less than the stock quantity $N_0$ memorized in the memory unit 101 (step S15). If the present quantity N is less than the stock quantity $N_0$ of the memory unit 101, the present quantity is memorized (step S16) and the operation is ended. Furthermore, if the present quantity N is equal to the stock quantity $N_0$, the message reminding that the drug has been forgotten to take out is displayed on the operation and display panel 7 (step S17), the processing flow then returns to step S5, and the drug dispensing operation is repeated.

Thus, if the operation of taking out the drug is completed, the rotor 23 is rotated to the receiving position. Therefore, the holding concave section 26 of the rotor 23 assumes a state of hiding inside the cassette 3, the rotor 23 cannot be rotated from the outside and the drug D cannot be taken out easily. Thus, narcotics or powerful drugs can be adequately controlled without paying much attention thereto.

Because the quantity of drugs D contained in the cassette 3 is detected with the reed switch 14, which is the detection means, the prescribed display can be conduced based on the detection signal and the operator can be notified if the remaining amount is small.

The cassettes 3 were disposed horizontally so that they could be stacked in the vertical direction, but they can be also disposed vertically or in a tilted configuration. In such case, the shape of the storage shelves 2 can be changed appropriately accordingly to the installation space. For example, when the installation space of the storage shelf 2 can be formed only at the lower side, the cassettes 3 may be disposed vertically and the drugs D may be taken out from the upper surface side. Furthermore, the cassettes 3 can be arranged transversally and disposed so that vials or the like face upward by the lid side thereof.

An apparatus for measuring the elongated objects that uses reed switches 14 will be described below.

Figure 13:
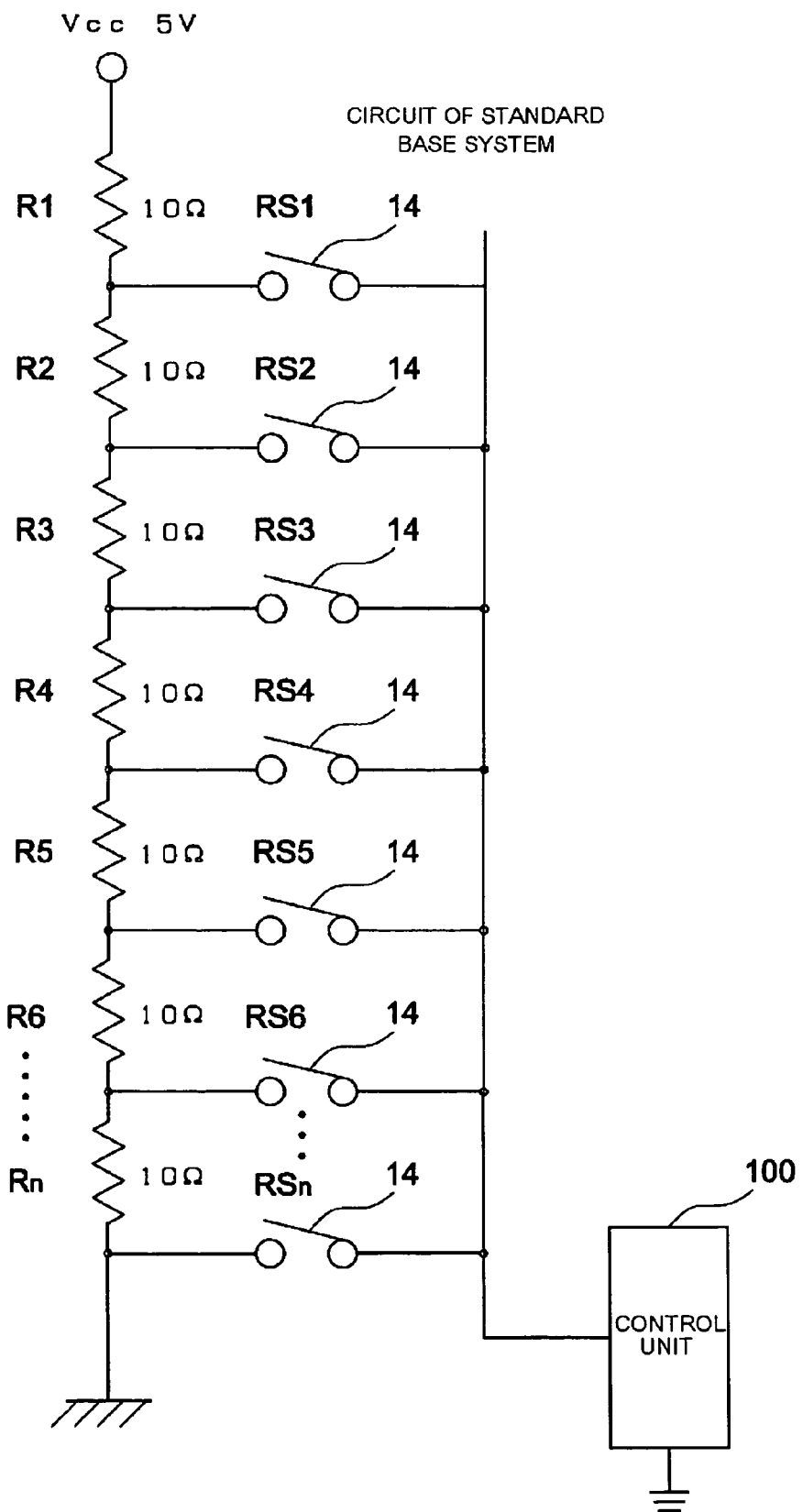
FIG. 13 is a circuit diagram of the basic measurement apparatus.

In the present embodiment, elongated objects are drugs arranged in one row. As shown in FIG. 13, the measurement apparatus comprises a resistor circuit in which of multiple resistors R1-Rn (10 W) connected in series, the resistor R1 at one end is connected to a Vcc terminal of a 5V constant voltage power source and the resistor Rn at the outer end is connected to the ground and a detection circuit in which one end of reed switches 14 denoted by RS1-RSn is connected between the adjacent resistors R1-Rn and the other end of the reed switches 14 denoted by RS1-RSn is connected to a detection terminal of the control unit 100. In this measurement apparatus, if the reed switch 14 denoted by RS1 is switched on, the voltage in the middle point of R1 and R2 is inputted into the control unit 100. For this reason, a voltage that differs (below 5 V) depending on the position of the reed switch 14 that was switched on can be detected.

Figure 14:
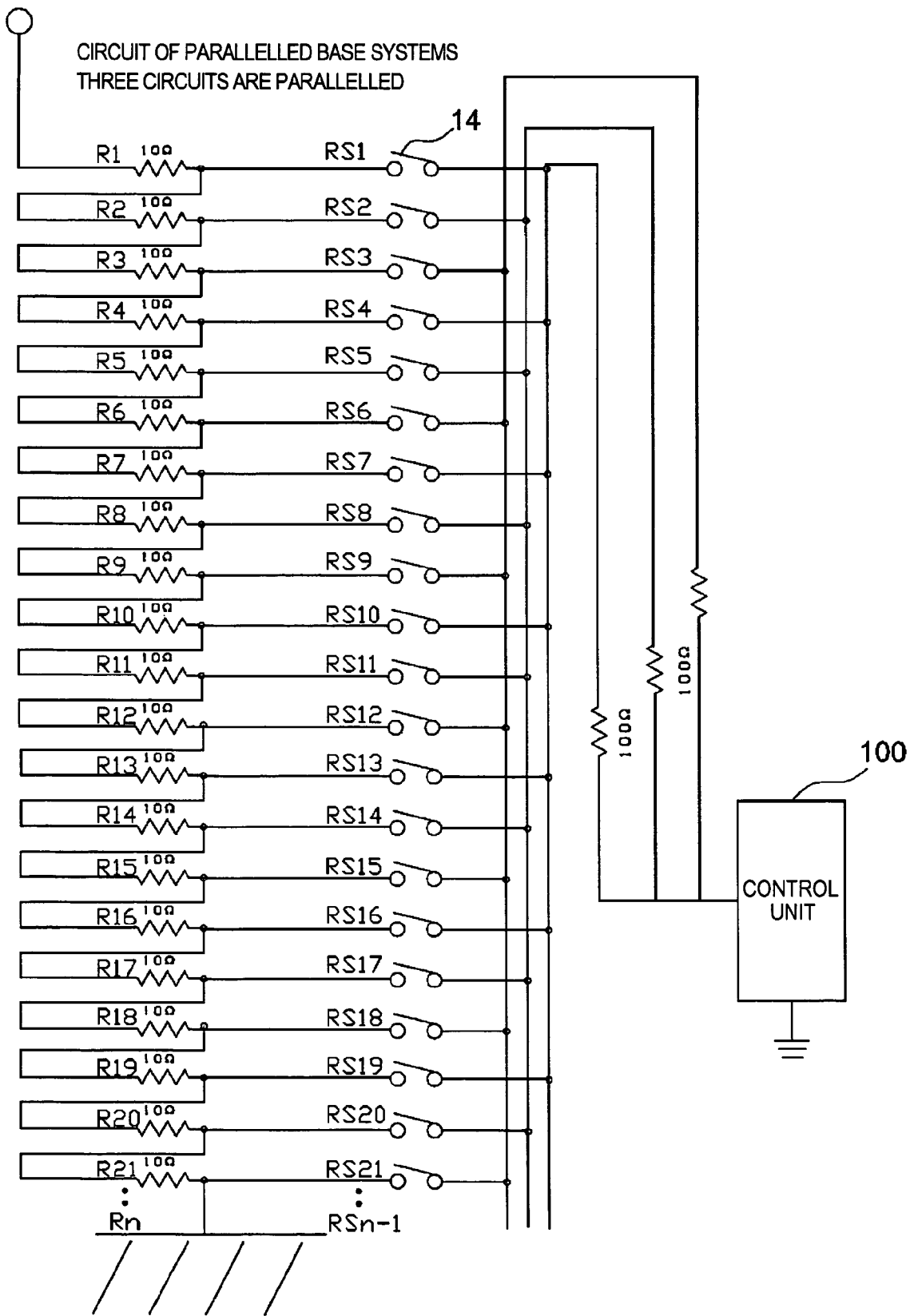
FIG. 14 is a circuit diagram of a measurement apparatus with three parallel circuits.
Figure 16:
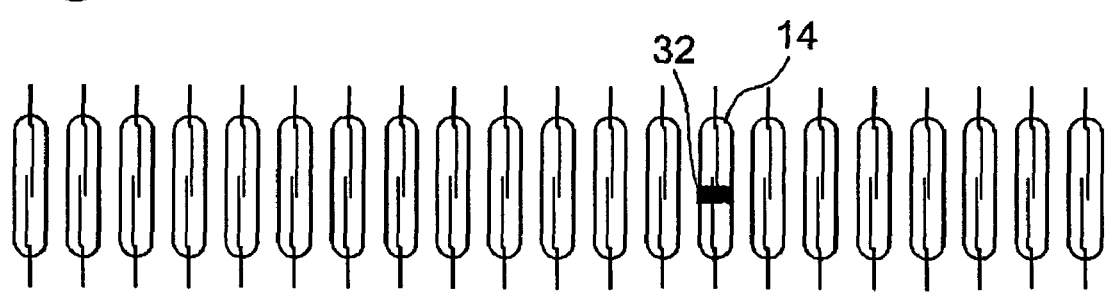
FIG. 16 is a plan view illustrating the arrangement of reed switches.
Figure 17:
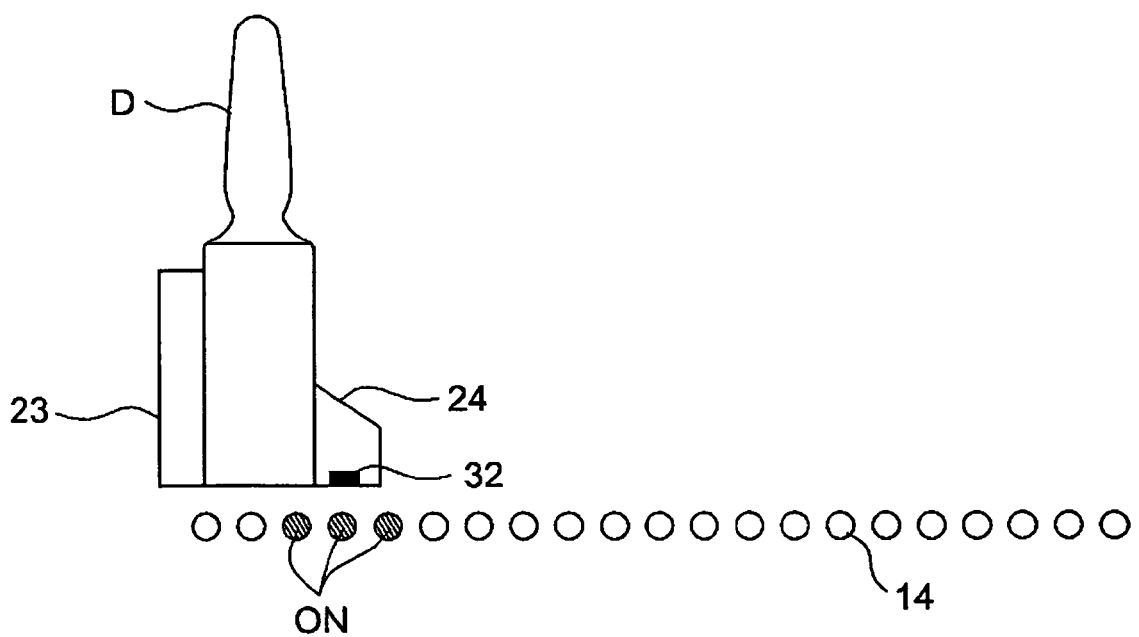
FIG. 17 illustrates the principle of measuring a first reference length of large-diameter arranged drugs.
Figure 18:
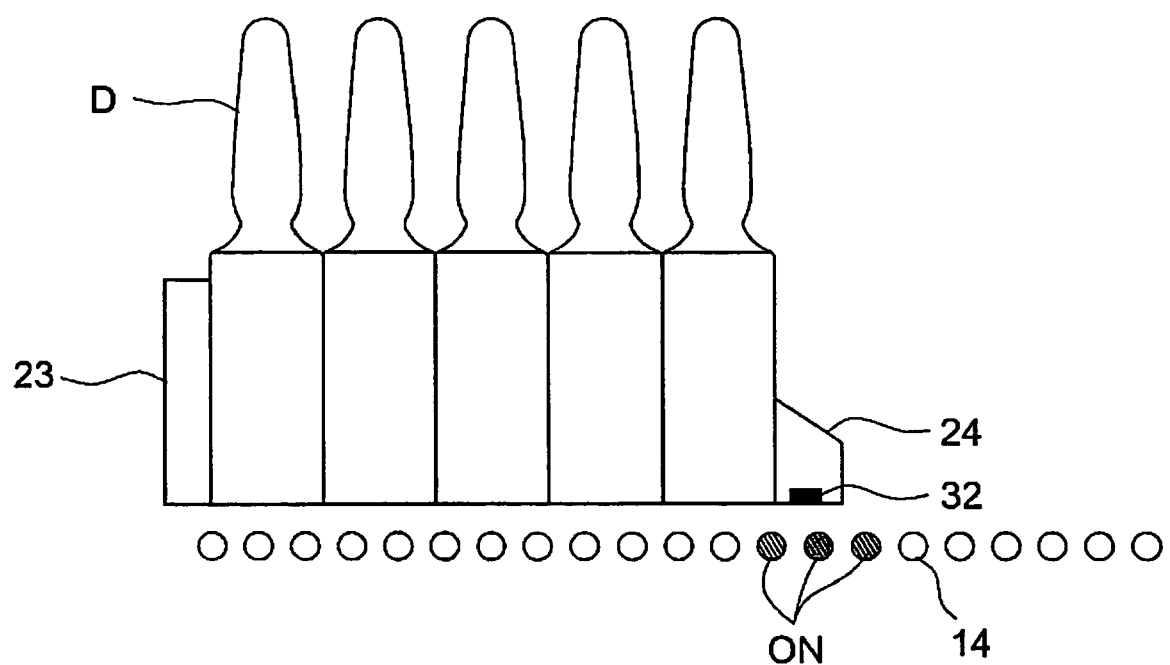
FIG. 18 illustrates the principle of measuring a second reference length of large-diameter arranged drugs.
Figure 19:
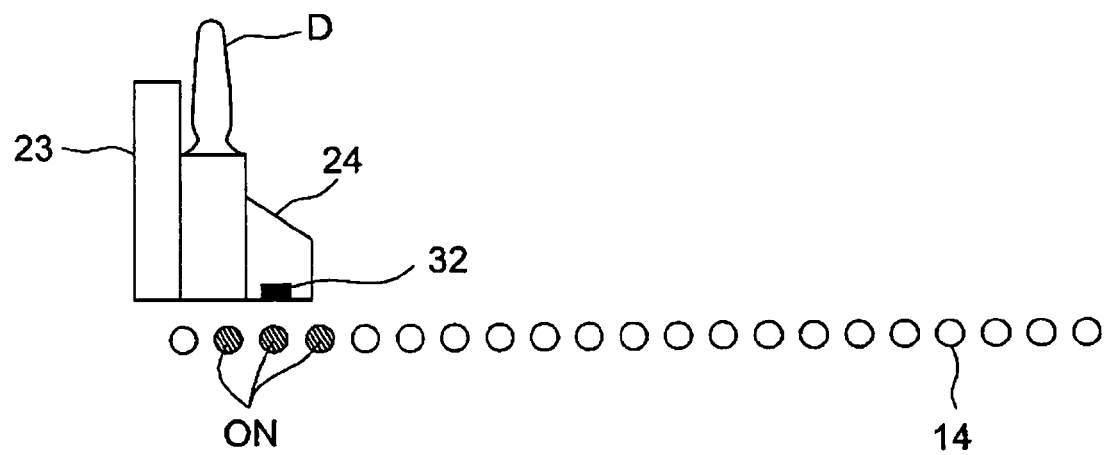
FIG. 19 illustrates the principle of measuring a first reference length of small-diameter arranged drugs.
Figure 20:
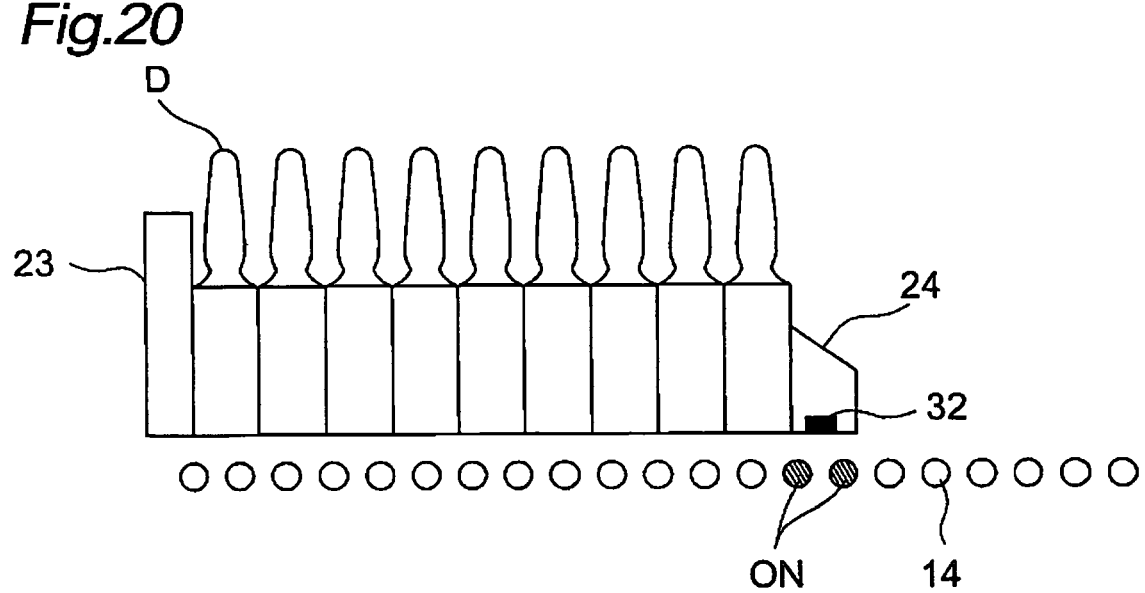
FIG. 20 illustrates the principle of measuring a second reference length of small-diameter arranged drugs.

In the measurement apparatus shown in FIG. 14, a plurality of detection circuits of the apparatus shown in FIG. 13 is disposed side by side. The first circuit comprises the reed switches 14 denoted by RS1, RS4, RS7, RS10, RS13, . . . , the second circuit comprises the reed switches 14 denoted by RS2, RS5, RS8, RS11, RS14, . . . , and the third circuit comprises the reed switches 14 denoted by RS3, RS6, RS9, RS12, RS15, . . . . Resistors R22, R23, R24 (100 Ω) are connected between the reed switches 14 and detection terminals of each circuit, respectively. As shown in FIG. 16, reed switches 14 are disposed in a row with a spacing of 5 mm. As shown in FIG. 17 and FIG. 18, if the magnet 32 approaches one reed switch 14, this reed switch 14 and the two reed switches 14 adjacent thereto are turned ON. Furthermore, as shown in FIG. 19 and FIG. 20, if the magnet 32 approaches the position between two reed switches 14, then those two reed switches 14 are turned ON. Therefore, of the reed switches 14 provided in each of the three circuits, more than two reed switches are not turned ON at the same time.

Assuming that RS9 of the first circuit, RS10 of the second circuit, and RS11 or the third circuit are switched on, the voltage $V_9$, $V_{10}$, $V_{11}$ applied to the RS9, RS10, RS11 is represented by the following formulas $$V_9 = [(R10 + \ldots + R21)/(R1 + \ldots + R21)] \times 5 \text{ (V)} \quad \text{[Formula 1]}$$
$$= 120/210 \times 5 \text{ (V)}$$

$$V_{10} = [(R11 + \ldots + R21)/(R1 + \ldots + R21)] \times 5 \text{ (V)} \quad \text{[Formula 2]}$$
$$= 110/210 \times 5 \text{ (V)}$$

$$V_{11} = [(R12 + \ldots + R21)/(R1 + \ldots + R21)] \times 5 \text{ (V)} \quad \text{[Formula 3]}$$
$$= 100/210 \times 5 \text{ (V)}$$

Those voltages $V_9$, $V_{10}$, $V_{11}$ are averaged by passing through a 100Ω resistance and inputted into the control unit 100.

Furthermore, when RS10 of the first circuit and RS11 of the second circuit are switched on, the voltage $V_{10}$, $V_{11}$ applied to the RS10, RS11 is represented by the following formulas $$V_{10} = [(R11 + \ldots + R21)/(R1 + \ldots + R21)] \times 5 \text{ (V)} \quad \text{[Formula 4]}$$
$$= 110/210 \times 5 \text{ (V)}$$

$$V_{11} = [(R12 + \ldots + R21)/(R1 + \ldots + R21)] \times 5 \text{ (V)} \quad \text{[Formula 5]}$$
$$= 100/210 \times 5 \text{ (V)}$$

Those voltages $V_{10}$, $V_{11}$ are averaged by passing through a 100 Ω resistance and inputted into the control unit 100.

In the measurement apparatus shown in FIG. 13, if the magnet 32 is positioned between the reed switches 14 denoted by R2 and R3 and two reed switches 14 denoted by RS2, RS3 are switched on, then the electric current will flow mainly in the reed switch 14 denoted by RS2, which is located upstream. As a result, there is a risk of detecting the magnet 32 as being positioned close to the reed switch 14 denoted by R2. Therefore, in the measurement apparatus shown in FIG. 13, if the arrangement pitch of the reed switches 14 is 5 mm, the resolution is also 5 mm. By contrast in the measurement apparatus shown in FIG. 14, if the magnet 32 is positioned between two reed switches 14 and the two reed switches 14 are switched on, then the averaged voltage is detected. Therefore, if the arrangement pitch of reed switches 14 is 5 mm, a resolution of 2.5 mm, which is half of the arrangement pitch, can be obtained.

Furthermore, in the measurement apparatus shown in FIG. 13, if the magnet 32 is positioned close to the reed switch 14 denoted by R3 and three reed switches 14 denoted by RS2, RS3, and RS4 are switched on, then the electric current will flow mainly in the reed switch 14 denoted by RS2, which is located upstream. As a result, there is a risk of detecting the magnet 32 as being positioned close to the reed switch 14 denoted by R2 rather than the reed switch denoted by R3. By contrast in the measurement apparatus shown in FIG. 14, even if the three reed switches 14 denoted by RS2, RS3, and RS4 are switched on, because the detection circuits are separate circuits, the electric current flows in all the reed switches 14 and accurate detection is possible.

Figure 15:
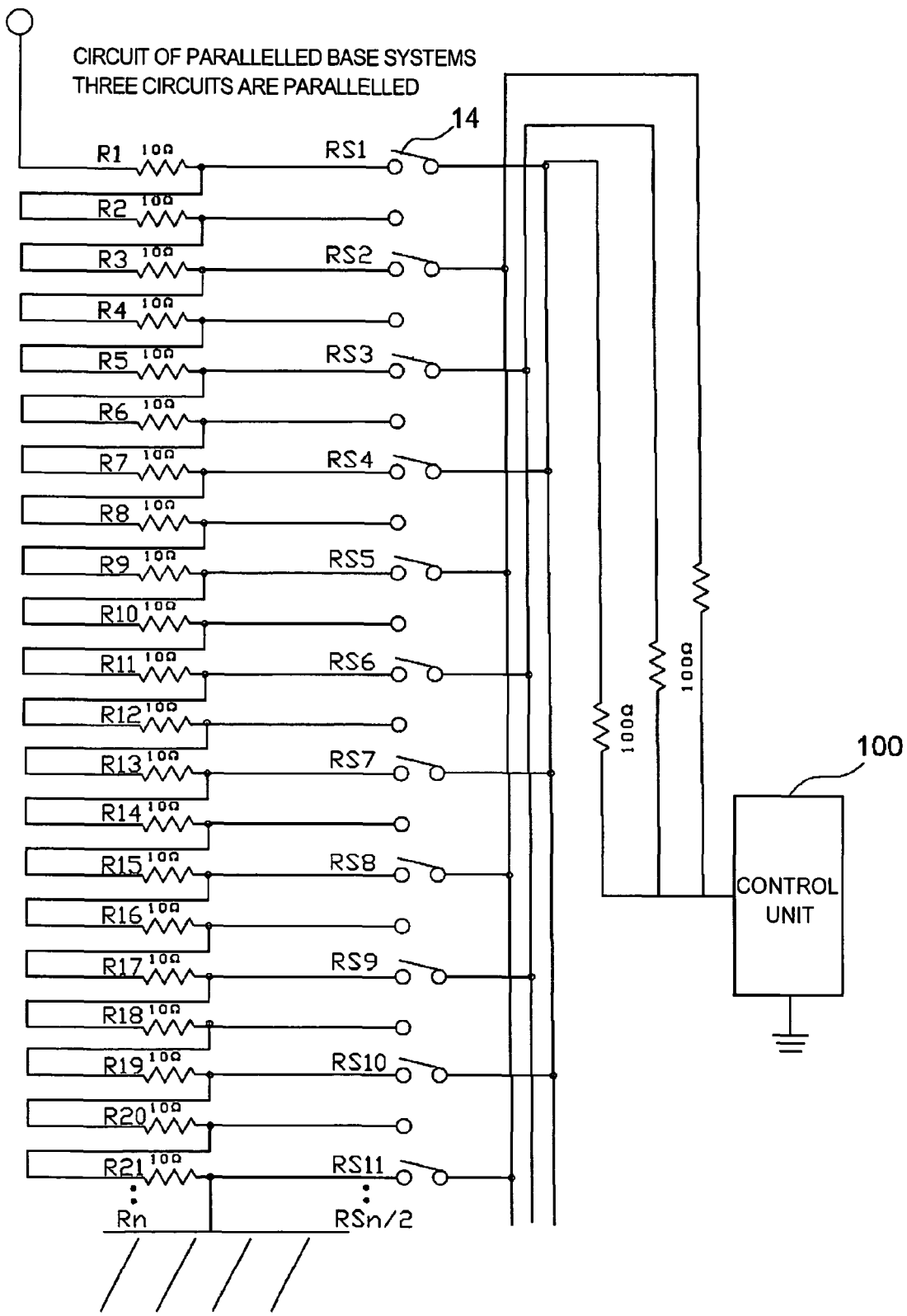
FIG. 15 is a circuit diagram of a modification example of the measurement apparatus with three parallel circuits.

In the measurement apparatus shown in FIG. 15, the reed switches 14 with even numbers in the measurement apparatus shown in FIG. 14 are removed. In this case, the arrangement pitch of reed switches 14 is 10 mm and the resolution drops to 5 mm, but because the number of reed switches 14 is decreased by half, the cost can be reduced.

Figure 21:
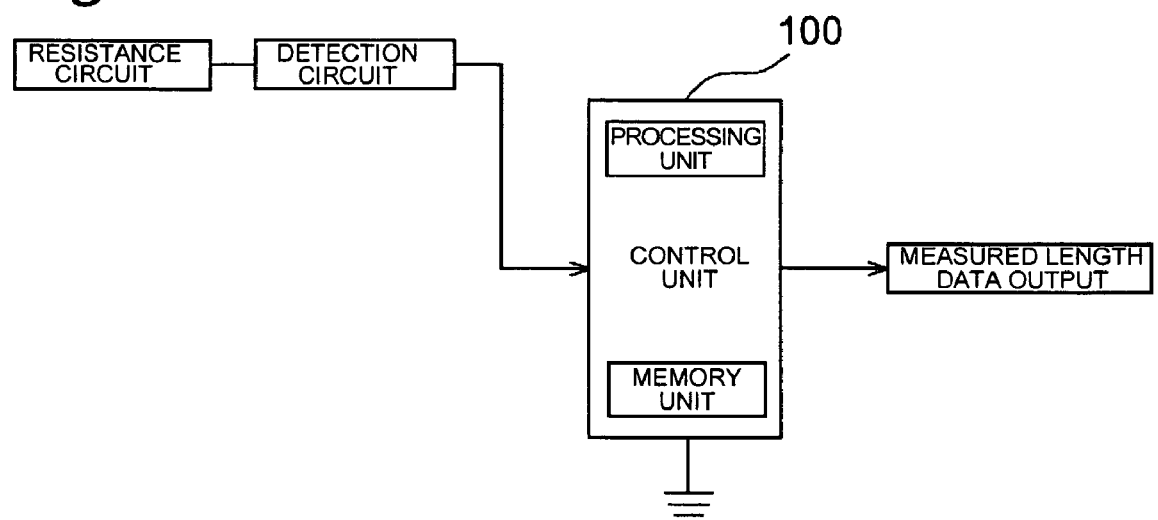
FIG. 21 is a block diagram of a measurement apparatus.

FIG. 21 is a block diagram of the measurement apparatus. The control unit 100 comprises a processing unit and a memory unit. If a voltage detected with the detection circuit during measurements is inputted into the control unit 100, the voltage and computation conditions stored in the memory unit are read out, the quantity of drugs corresponding to the detected voltage is computed in the processing unit, and the result obtained is outputted as the present quantity of drugs.

Figure 23:
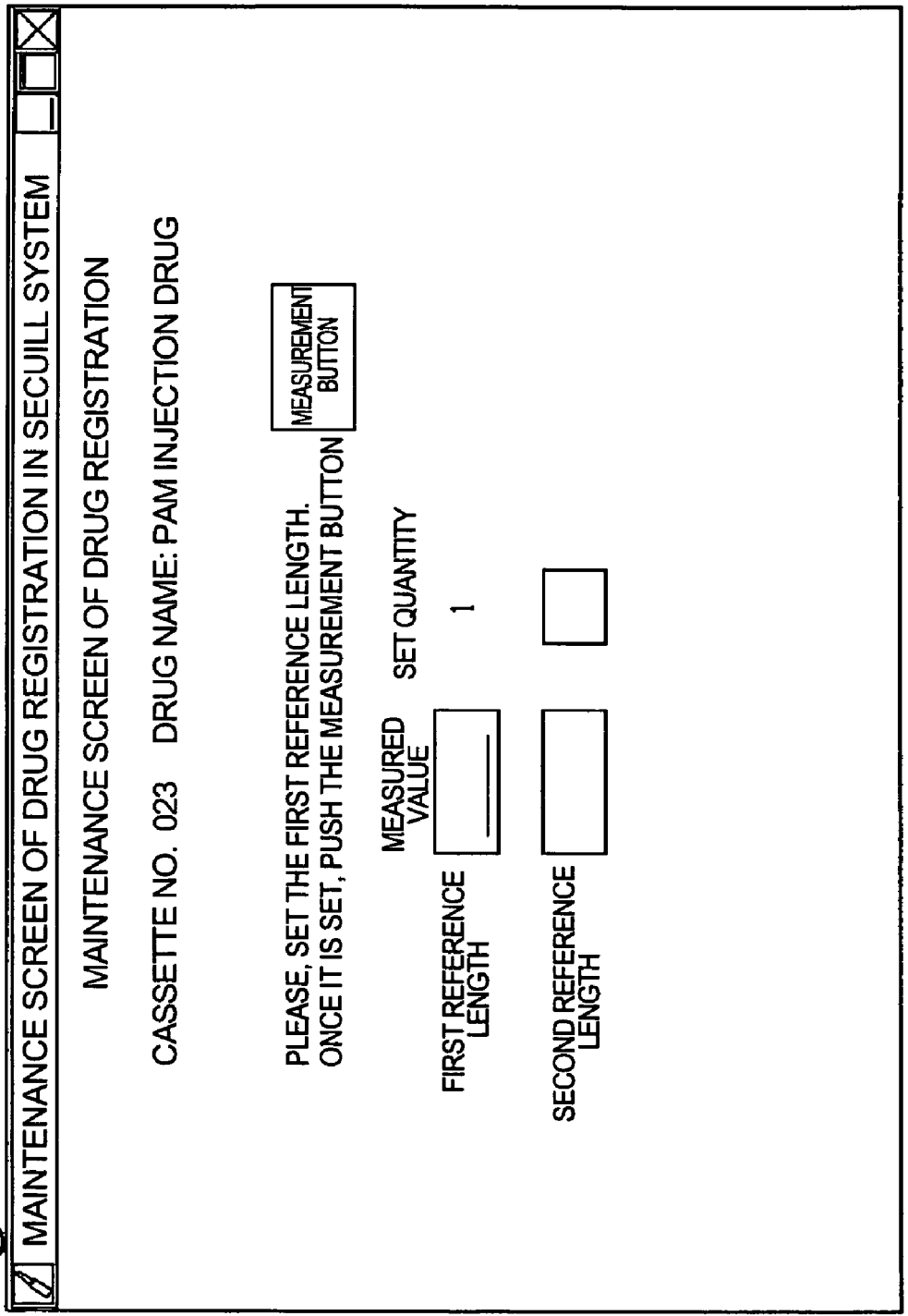
FIG. 23 is a front view illustrating the maintenance screen of the measurement apparatus.

In above-described measurement apparatus, an elongated material measurement reference is preset in the below-described manner. Thus, the number of the cassettes where the drugs are set, the drug name, the confirmation button (measurement button), condition setting items, first and second reference lengths, and the number of sets are displayed on the input screen shown in FIG. 23. Here, if PAM is set as a drug name and the cassette number is set to 23, guidance for measuring the drug will be displayed. The cursor is in the column of measurement values of the first reference length. In the present embodiment, the first reference length is taken as one drug.

Figure 22:
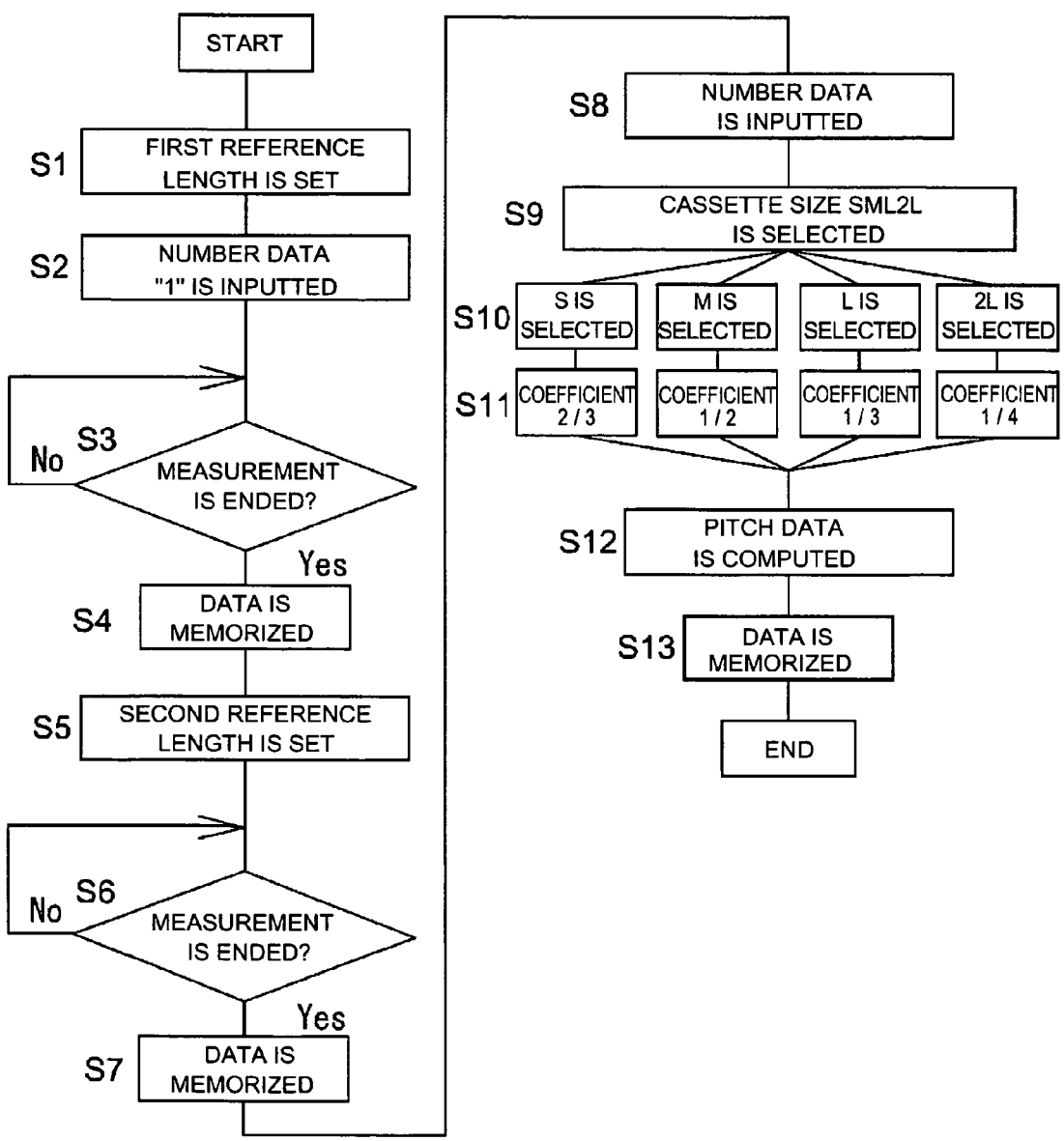
FIG. 22 is a flowchart illustrating the reference value setting operation of the measurement apparatus.
Figure 24:
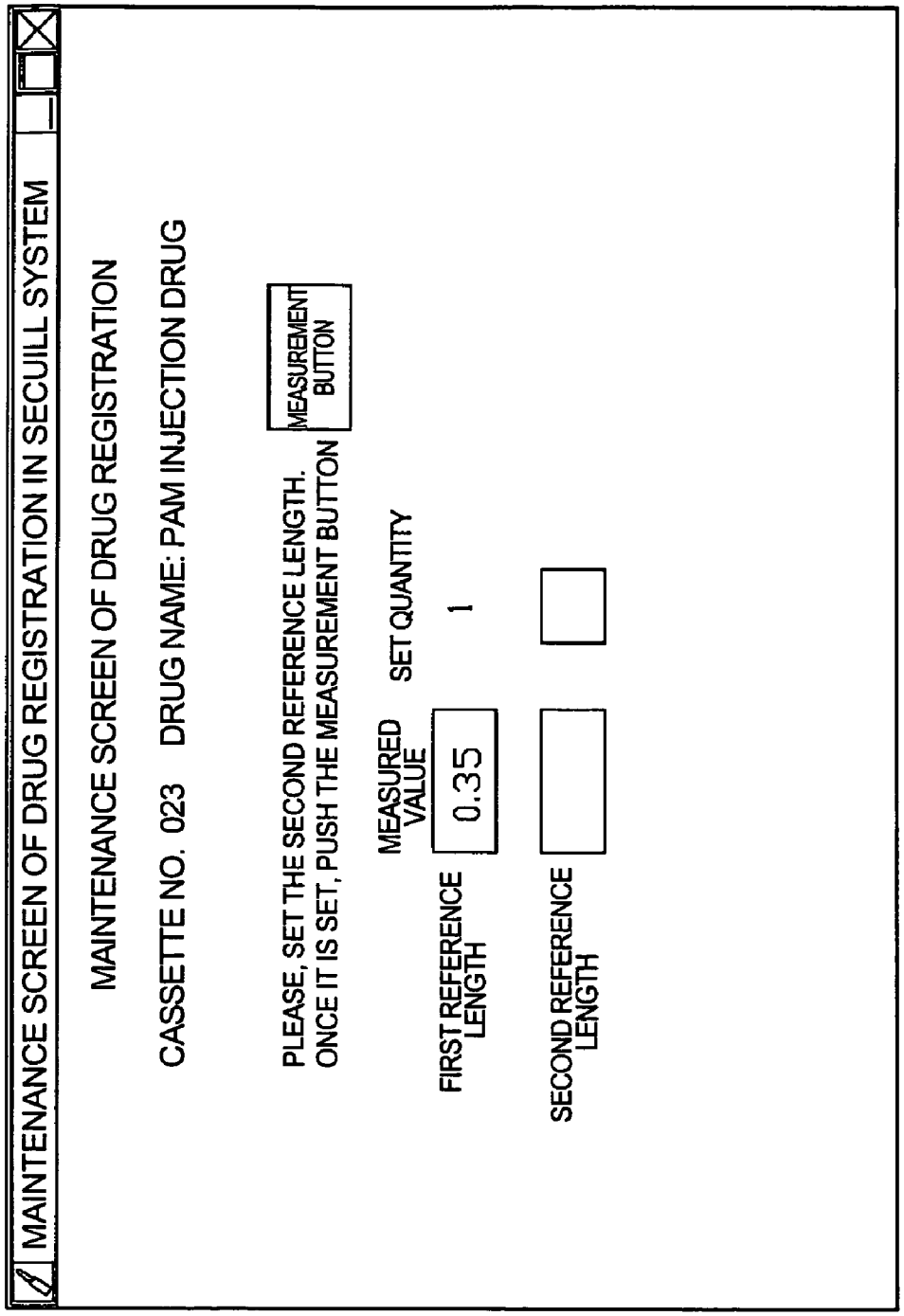
FIG. 24 is a front view illustrating the maintenance screen of the measurement apparatus following FIG. 23.
Figure 25:
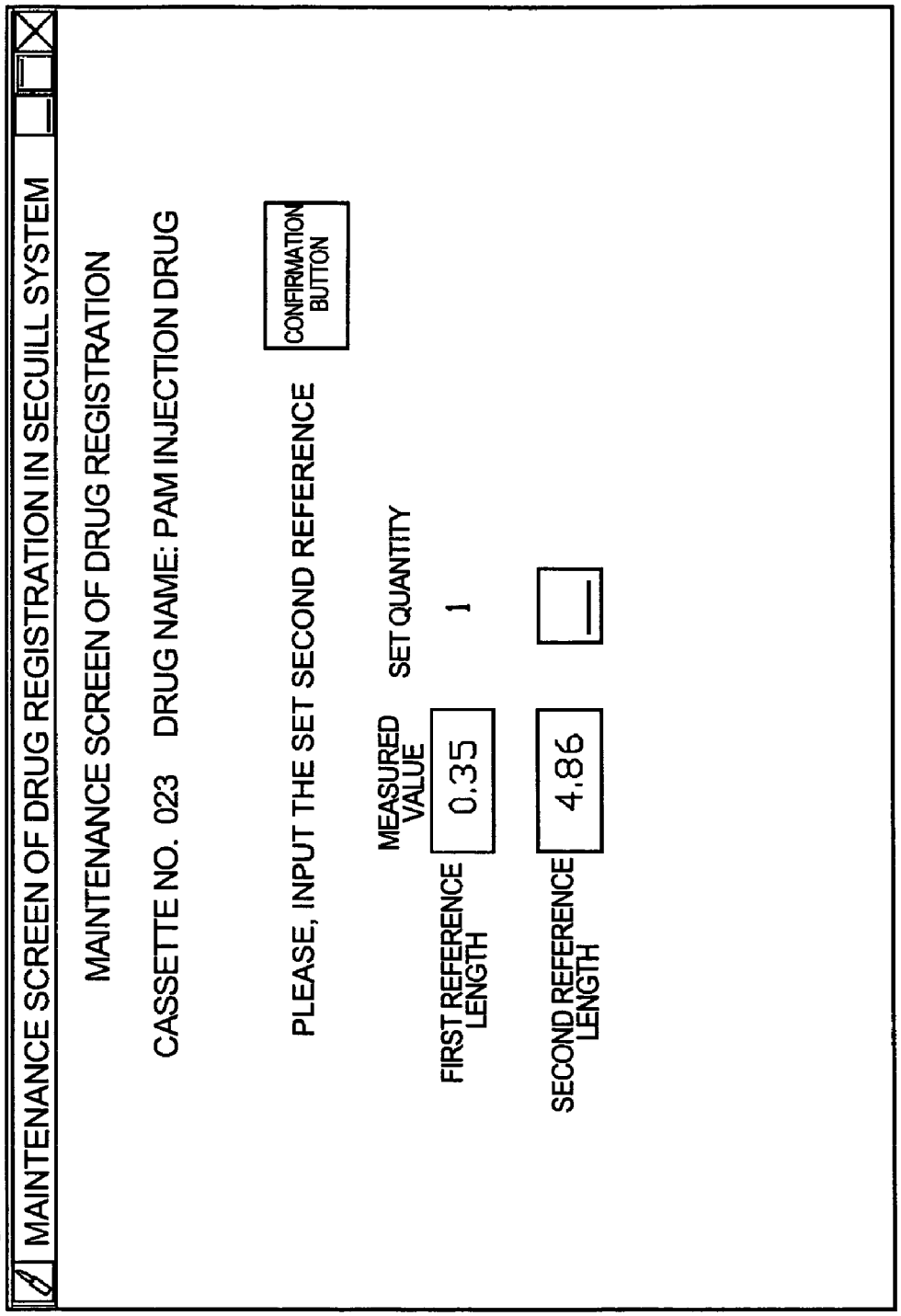
FIG. 25 is a front view illustrating the maintenance screen of the measurement apparatus following FIG. 24.
Figure 26:
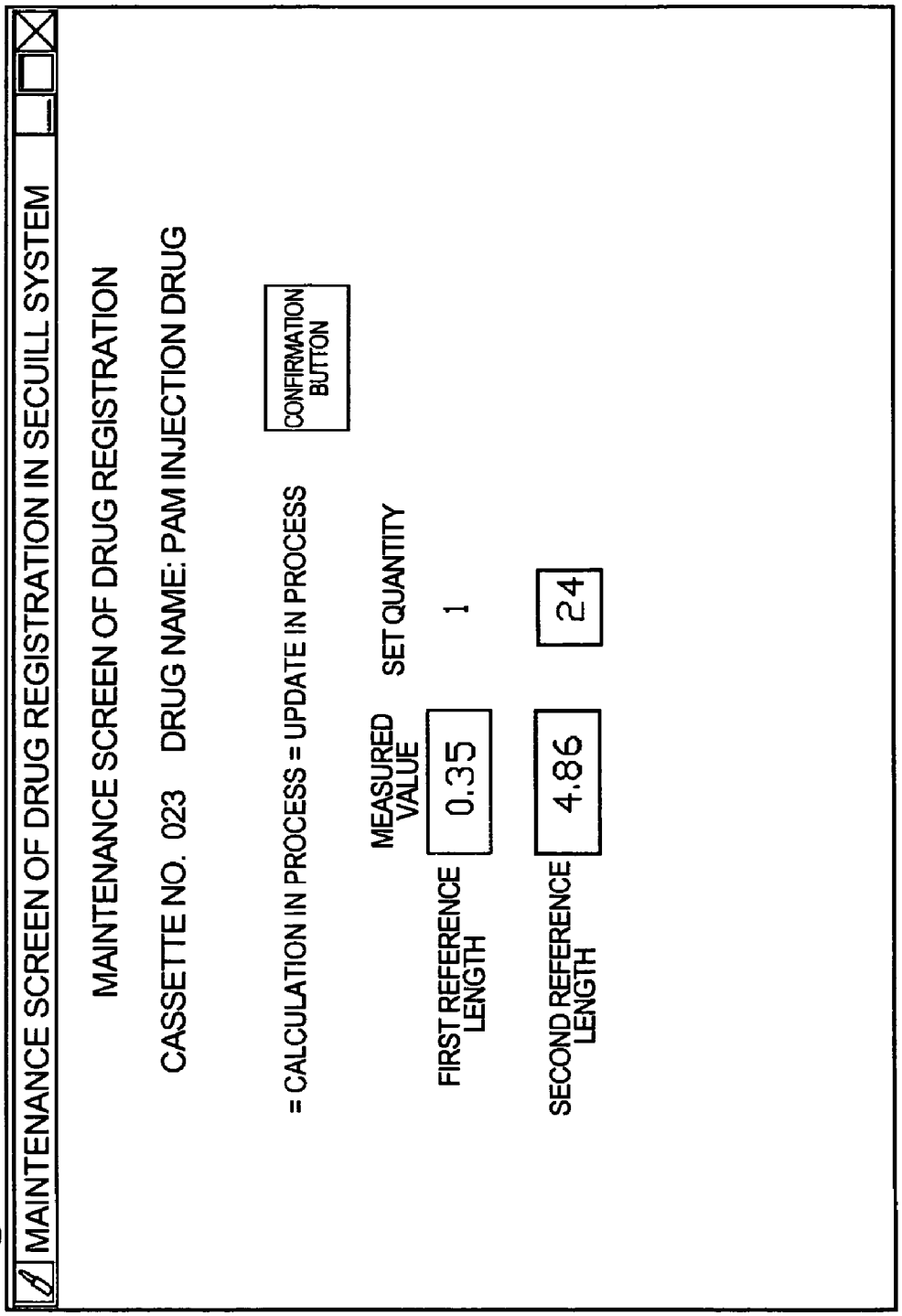
FIG. 26 is a front view illustrating the maintenance screen of the measurement apparatus following FIG. 25.

In the flowchart shown in FIG. 22, in step S1, one, for example, PAM (drug name) taken as a first reference length is set in a cassette, and the set number 1 is inputted in step S2 (here, the number has been preset to 1). If the measurement button is then pushed, as shown in FIG. 24, the present measurement voltage is displayed and the cursor moves to the second reference length. If the measurements are completed in step S3, then the measurement data are stored in step S4. In step S5, 24 drugs PAM taken as the second reference length are set into the cassette, as shown in FIG. 25. Here, if the measurement button is pushed the present voltage is displayed and the cursor moves to a number input column, as shown in FIG. 26. Therefore, the number is inputted as 24. If the measurements are completed in step S6, the measurement data are stored in step S7. If then the number data are further inputted in step S8, the drug size is selected from S, M, L, 2L in step S9. Here, because the cassette has been provided with a cassette number identification and was registered in the cassette master, a coefficient may be automatically selected, as in step S10, based on the cassette number, or the selection may be made manually as in step S11. In step S12, the pitch data is calculated and the upper limit value and lower limit value thereof are calculated. The pitch data are then stored in step S13. When setting of measurement references for the drugs on the screen shown in FIG. 27 is continued, the above-describes steps are repeated, and when the setting is not continued, the processing flow ends.

The formulas for calculating the calculated lower limit value of pitch (calculated Pmin) and calculated upper limit value (calculated Pmax) in the case where the first reference length measurement value is 1 are represented by Formula 6 and Formula 7, respectively.

Calculated $P\text{min}$=[(second reference length measurement value)−(first reference length measurement value)]/[(second reference length measurement value)−1] [Formula 6]

Calculated $P\text{max}$=(Calculated $P\text{min}$)×(variation correction coefficient)+(Calculated $P\text{min}$) [Formula 7]

Variation correction coefficient: $2/3$, $1/2$, $1/3$, $1/4$ as drug diameter error (see the step of selecting the cassette size in flow chart).

In the case the first reference length measurement number is other than 1 and the calculated example are shown by Formula 8.

(First reference length measurement value)=(First reference length measurement value)/(First reference length measurement number) [Formula 8]

Calculation Example:
Cassette size M=$1/2$
First reference length measurement value=0.8
Second reference length measurement value=4.8
Second reference length measurement number=22

Calculated $P\text{min}$=(4.8−0.8)/(22−1)=0.1905

Calculated $P\text{max}$=(0.1905×$1/2$)+0.1905=0.28575

Figure 29:
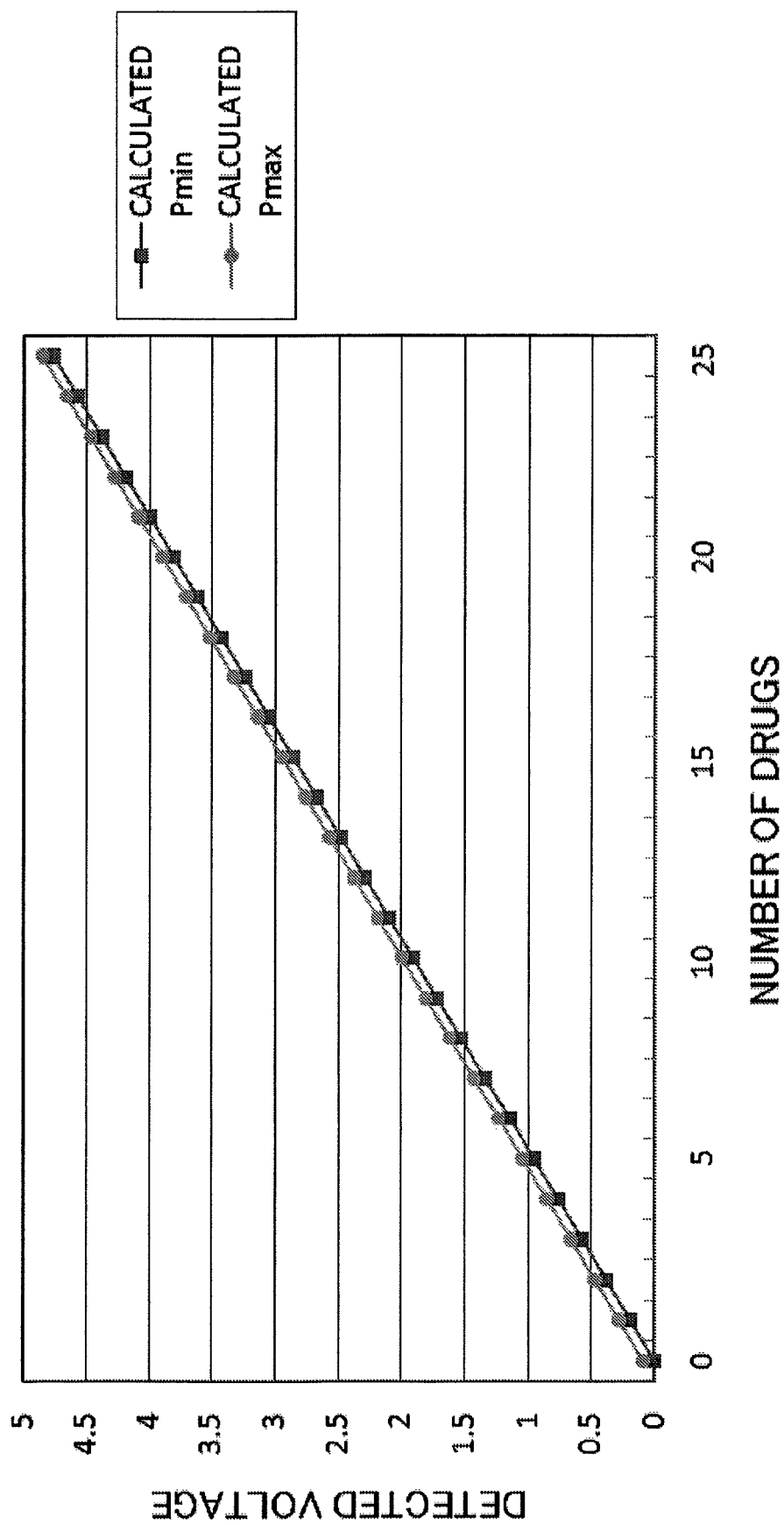
FIG. 29 is a graph illustrating the relationship between a voltage and a number of drugs.

The numerical values and graphs of the calculation example are shown in FIG. 28 and FIG. 29, respectively. The number of drugs D in the cassette can be found from the detected voltage by using those FIG. 28 and FIG. 29.

The number of drugs D can be found by the following method. If
a: number of drugs, n (n>2);
b: measured voltage in the case the number of drugs is 1;
c: measured voltage in the case the number of drugs is n, then the average voltage e for 1 drug is represented by Formula 9.

$e=(c-b)/(a-1)$ [Formula 9]

The measured voltage obtained when the number of drugs is x is found by the Formula 10.

$y=e(x-1)+d$ [Formula 10]

$d=e/2$ ($d$: offset amount)

Therefore, the number x of drugs found when the measured voltage is y can be found by Formula 11.

$x=(1/e)y+[1-(d/e)]$ [Formula 11]

Here, the found number x of drugs is represented as a detected number X by taking the integer part thereof. For example, if $3.0 \leq x < 4.0$, then the detected value X is taken as 3. When y+d<b, that is, when "the measured voltage+offset amount" is equal to or less than the measured voltage b obtained for 1 drug, then the detected number X is unconditionally taken as 0 and calculations of Formula 10 and Formula 11 cannot be conducted.

In Formula 10, the drug center is taken as a reference by adding the offset value d to the value obtained by deducting 1 from the drug number x and multiplying by the average voltage e. When the drug diameter is large, the offset value d may be taken as d=e/3 or e/4.

Another embodiment of the elongated object measurement apparatus will be described below. In this embodiment, the reed switches 14 that were employed in the above-described embodiment are not used, and a slide resistor is employed. In the explanation below, the components identical to those of the above-described embodiment will be assigned with identical reference numerals and explanation thereof will be omitted. Only different components will be explained.

Figure 30:
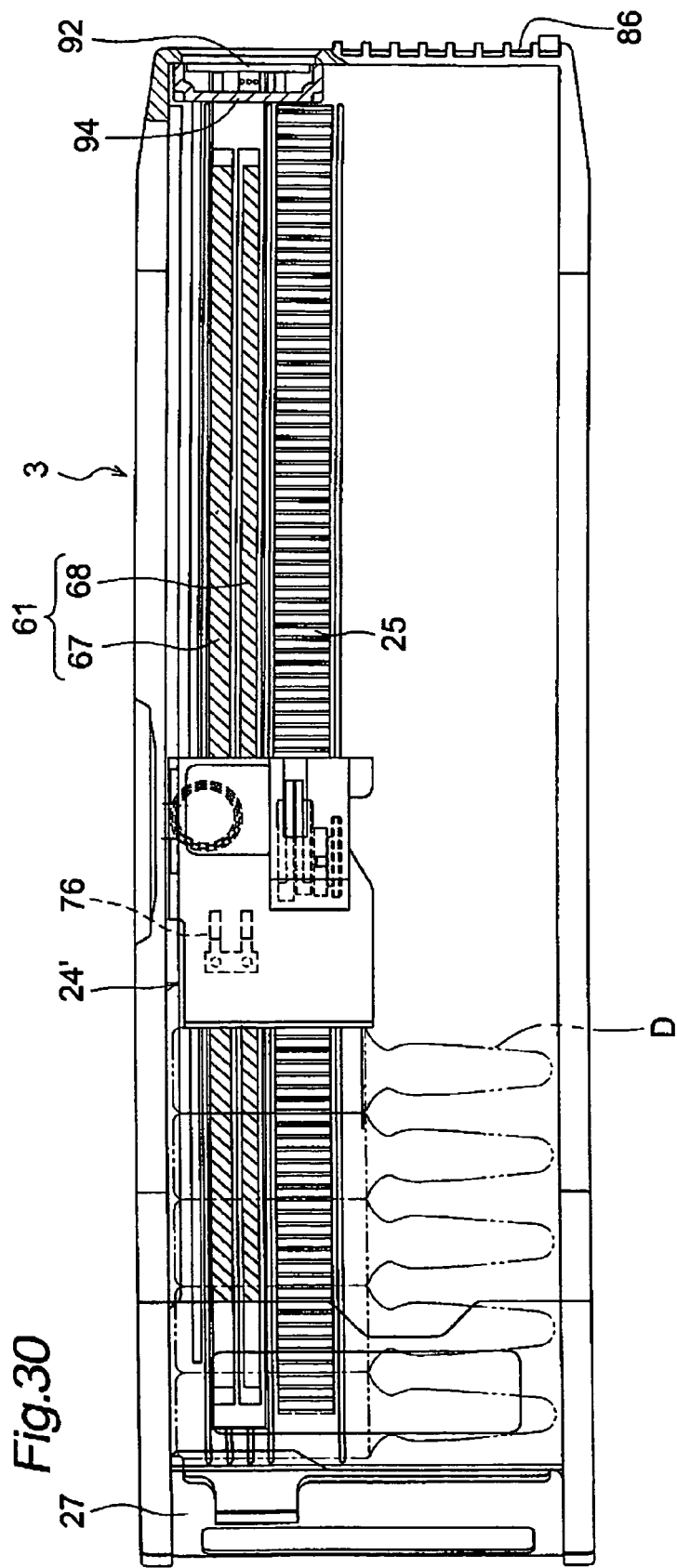
FIG. 30 is a plan view of a cassette in another embodiment of the present invention.
Figure 31:
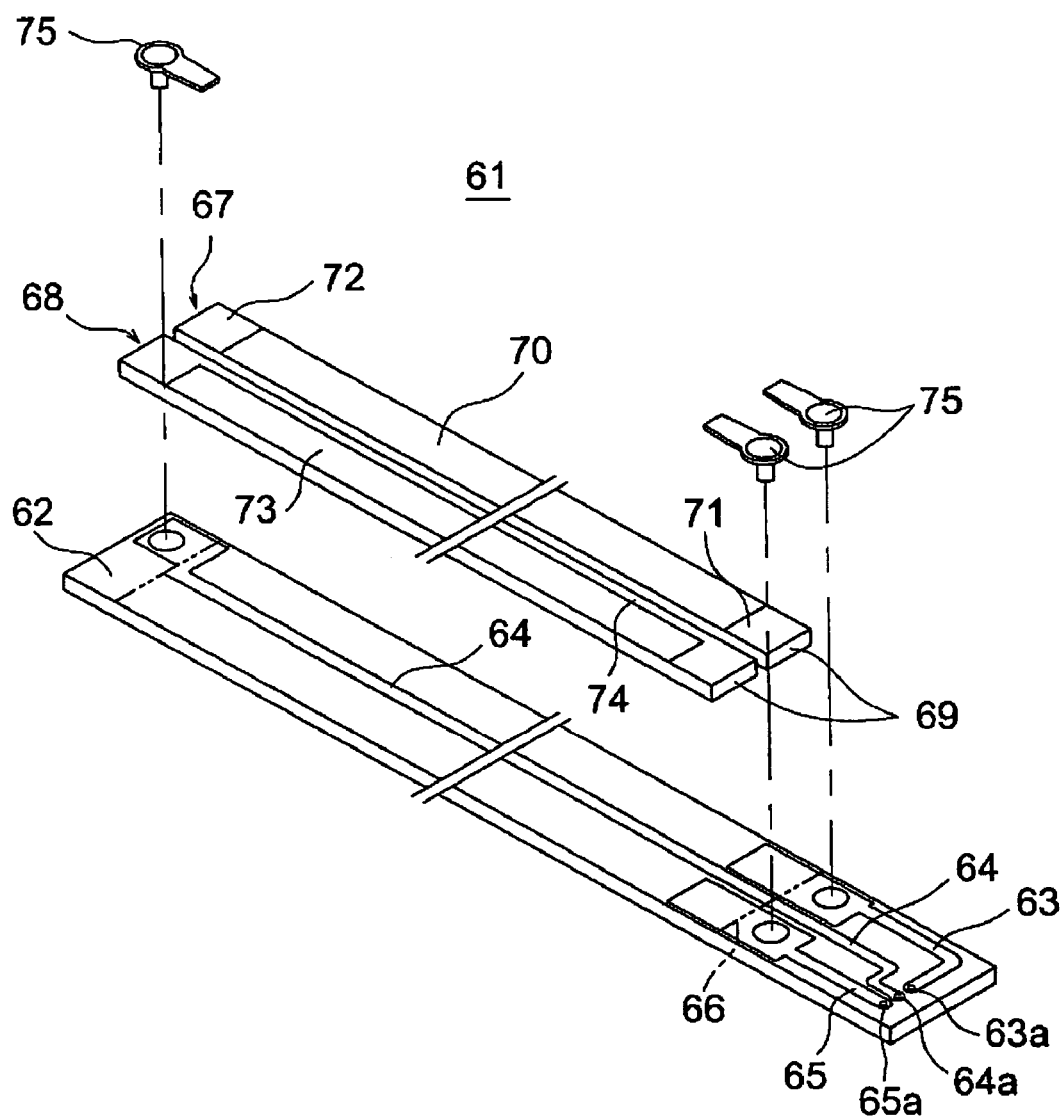
FIG. 31 is a plan view of a slide resistance unit.
Figure 32:
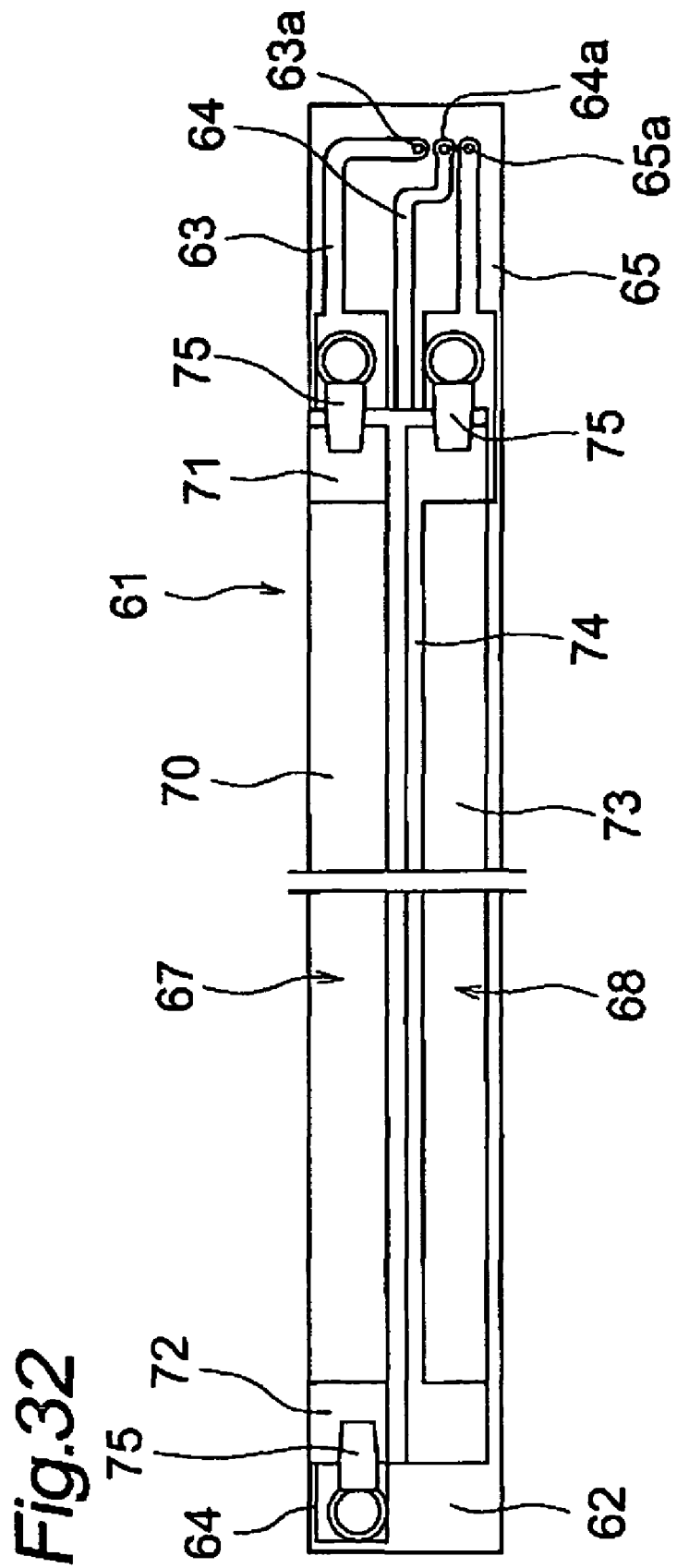
FIG. 32 is an exploded perspective view of the slide resistance unit shown in FIG. 31.
Figure 34:
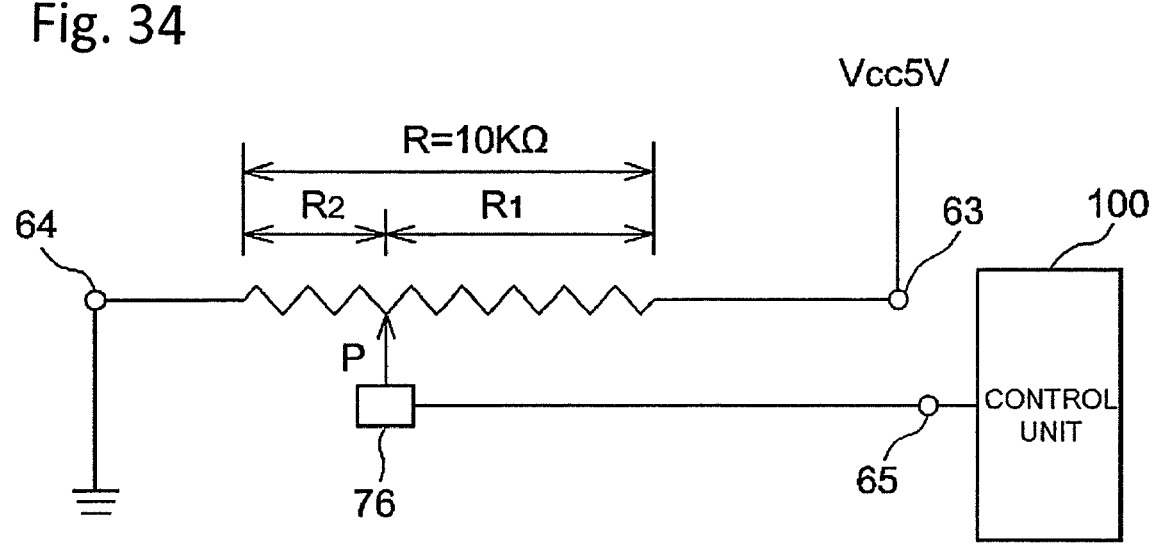
FIG. 34 is a circuit diagram of the measurement apparatus using the slide resistance unit.

As shown in FIG. 30, a slide resistance unit 61 is installed parallel to the rack 25 on the inner bottom surface of the cassette 3. In this slide resistance unit 61, as shown in FIG. 31 and FIG. 32, a plus-side conductor pattern 63, a minus-side conductor pattern 64, and a detection-side conductor pattern 65 are provided at one end section of a long rectangular insulating substrate 62, and the minus-side conductor pattern 64 extend to the other end side of the substrate 62. Two (first and second) thin long slide resistance plate 67, 68 are parallel to each other and pasted with a two-side tape 66 on the conductor patterns 63, 64, 65 of the substrate 62. The first slide resistance plate 67 is obtained by baking a resistance paste 70 on a Mylar film 69 and then baking silver pastes 71, 72 on both end sections. The electric resistance of a resistance paste 70 located between the silver pastes 71, 72 at both ends is 10 Ω. The second slide resistance plate 68 is similarly produced by baking a resistance paste 73 on the Mylar film 69 and baking a silver paste 74 from one end to the other end through a side edge on one side. The silver paste 71 at one end of the first slide resistance plate 67 is connected via a clasp 75 to the plus-side conductor pattern 63, and the silver paste 72 at the other end is connected via the clasp 75 to the minus-side conductor pattern 64. The silver paste 74 of the second slide resistance plate 68 is connected to the detection-side conductor pattern 65 via the clamp 75. The plus-side conductor pattern 63 of the slide resistance unit 61 is connected, as shown in FIG. 34, to a Vcc terminal of the 5 V constant voltage power source, the minus-side conductor pattern 64 is connected to the ground, and the detection-side conductor pattern 65 is connected to the detection terminal of the control unit 100.

A pushing unit 24' of the cassette 3 is similar to the pushing unit 24 of the above-described embodiment and has a configuration similar to that of the pushing unit 24 of the above-described embodiment, except that the magnet is absent, a pair of locking members 31 is provided, and a brush 76 is attached.

In a pair of locking members 31, the gear sections 51*b* thereof are shifted by half a pitch. As a result, when the lid body 22 is open, one of the locking members 31 is locked with the rack 25 and the pushing unit 24' is rapidly stopped.

The brush 76 comprises a plate-like base section 77 from an electric conductor and sliding sections 78, 79 mounted on the base section 77 and formed from elastic conductors disposed parallel to each other. Because the base section 77 of the brush 76 is attached to the pushing unit 24', the distal end portions of the sliding sections 78, 79 are slidably pressed against the first and second slide resistance plates 67, 68 of the slide resistance unit 61. Notches 80 are formed in the distal ends of the sliding sections 78, 79 and the distal ends are brought into uniform contact with the slide resistance plates 67, 68 even if the distal ends are somewhat inclined.

In the measurement apparatus comprising the slide resistance unit 61 and brush 76 of the above-described configuration, if a drug D is contained in the cassette 3 and the lid 22 is closed, the pushing unit 24' will move and push against the drug D. In this process the brush 76 of the pushing unit 24' will slide over the first and second slide resistance plates 67, 68 and stop in a position corresponding to the number of drugs D. If the stop position of the brush 76 is denoted by P, then a divided voltage of Vp=R2/R will be applied to the control unit 100 via the brush 76 located in the position P. The control unit 100 reads the computation conditions or voltage stored in the memory unit, the number of drug units corresponding to the detected voltage is calculated in the processing unit, and the result is outputted as the present quantity of drug units.

As described above, in the measurement apparatus using the slide resistance unit 61 and brush 76, it is not necessary to provide multiple reed switches as in the above-described embodiment. Therefore, the size can be reduced, the circuit structure is simplified, and cost can be reduced.

The measurement apparatuses of the above-described embodiments measure the quantity of drugs disposed side by side in a linear configuration, but disposing the switches equidistantly in the circumferential direction also makes it possible to measure the quantity of drugs disposed side by side along a circular arc. Furthermore, not only the quantity of drugs, but also the length of various elongated materials can be measured with a similar apparatus.

Figure 35:
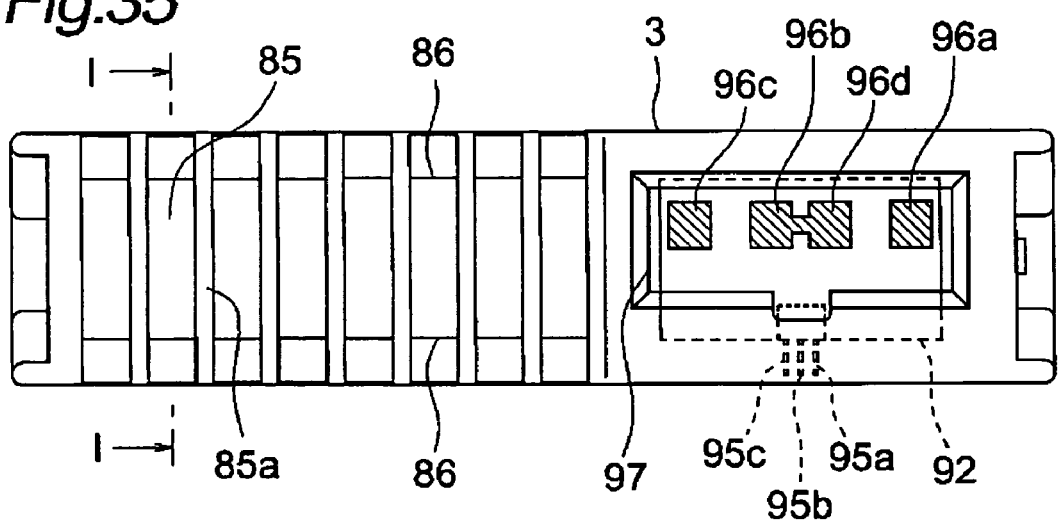
FIG. 35 is a back view illustrating the hook mounting section of the rear end surface of the cassette.
Figure 36:
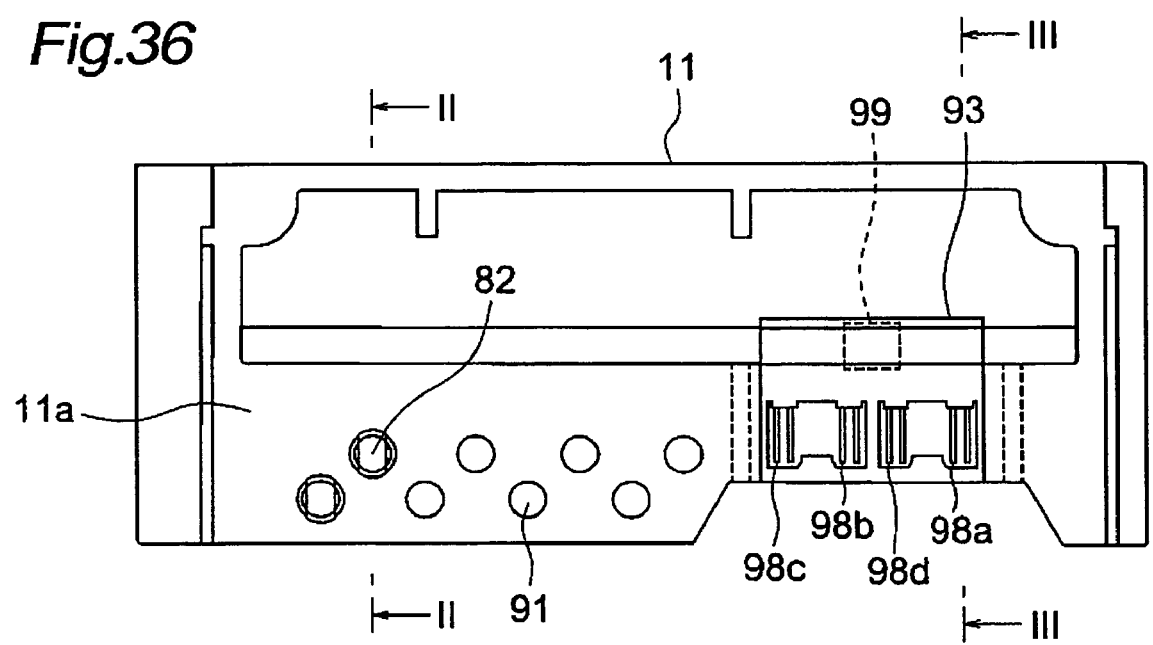
FIG. 36 is a back view illustrating pin holes of the accommodation member on the body side.
Figure 37:
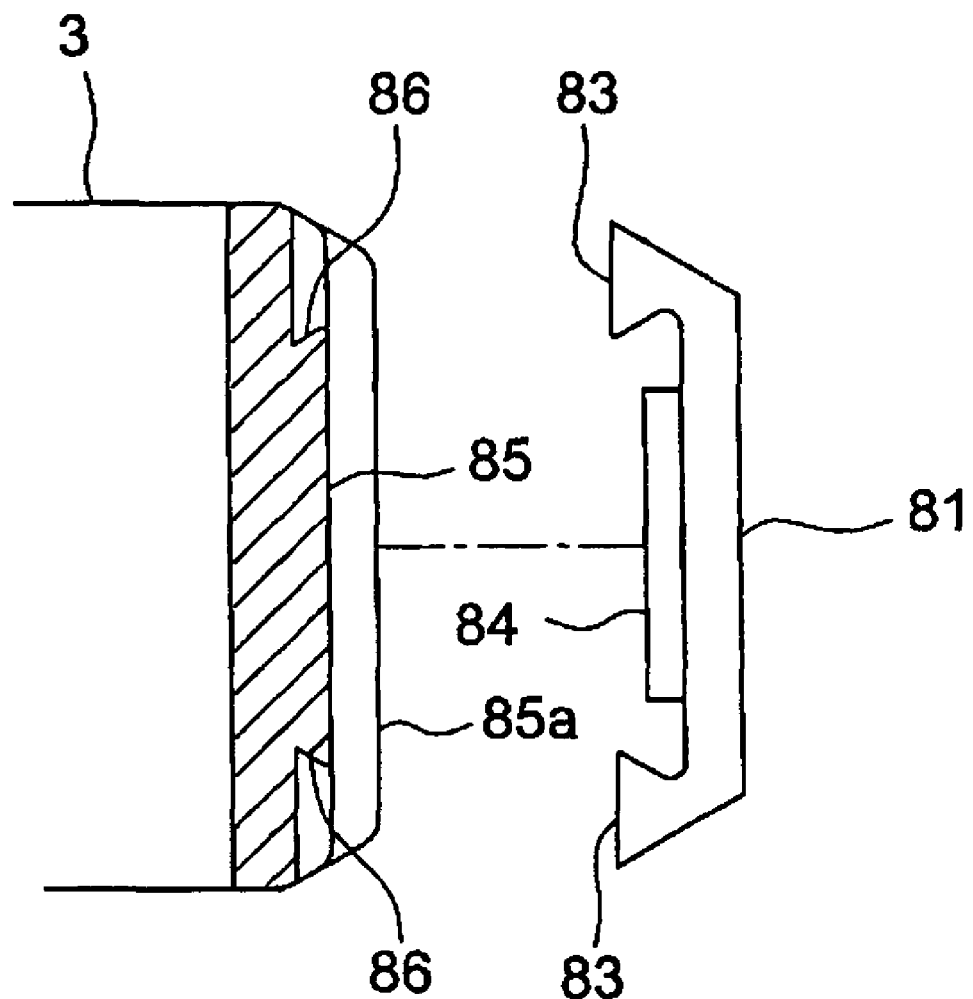
FIG. 37 is a cross-sectional view along the I-I line shown in FIG. 35.
Figure 38:
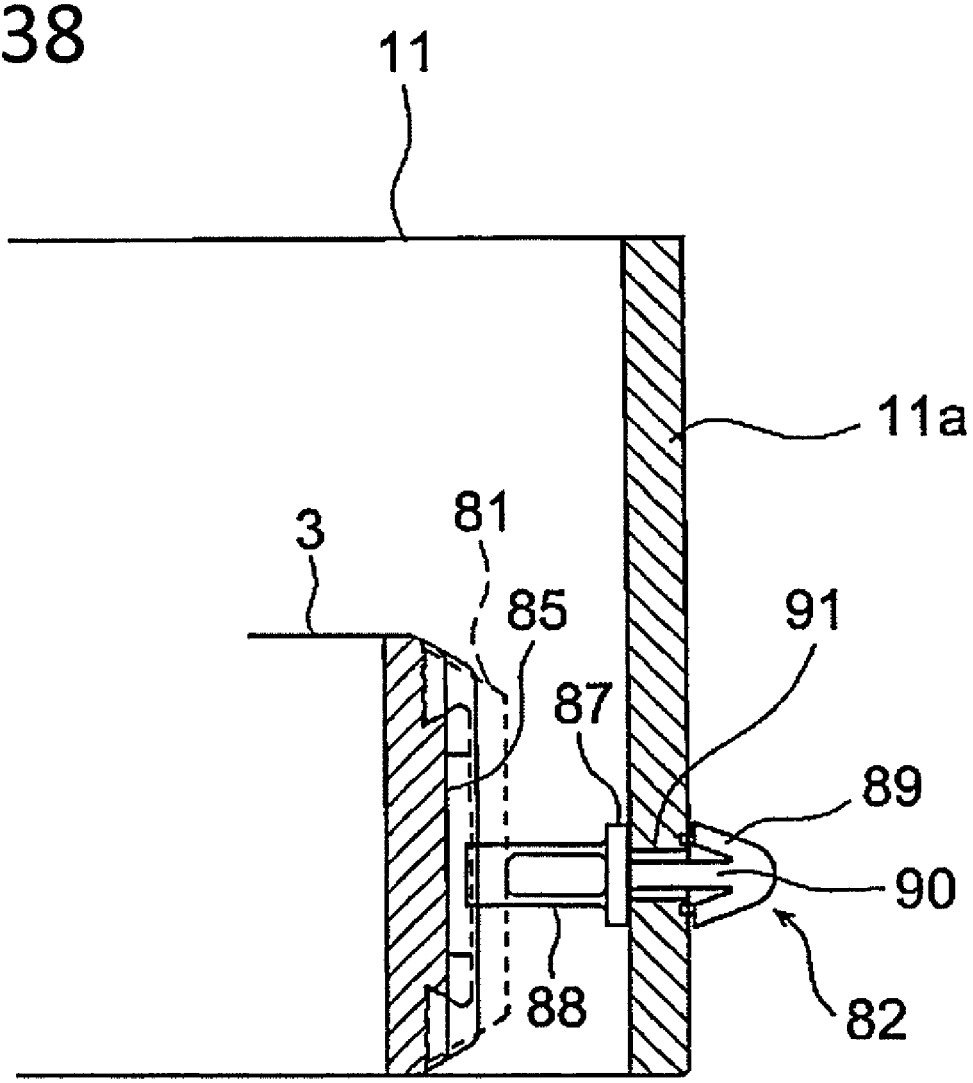
FIG. 38 is a cross-sectional view along the II-II line in FIG. 36.

Furthermore, it the present embodiments, as shown in FIG. 35 to FIG. 37, a hook 81 attached to the cassette 3 and a pin 82 attached to the accommodation member 11 on the body side provide for identification of the cassette 3 and prevent the cassette from being mounted erroneously. As shown in FIG. 37, the hook 81 attached to the cassette 3 has locking pieces 83 in the form of an elongated rectangular plate protruding from the upper and lower ends at one surface side and a protruding section 84 located between the locking pieces 83 and having a small degree of protrusion from the locking pieces 83. As shown in FIG. 35, a total of eight hook mounting sections 85 are provided side by side with a constant spacing in the horizontal direction at the rear end surface of the cassette 3 so as to rise from the rear end surface. Locking edges 86 for locking the locking pieces 83 of the hooks 81 are formed at the upper and lower end of each hook mounting section 85. A partition wall 85*a* is formed between the adjacent hook mounting sections 85.

On the other hand, the pin 82 attached to the long wall surface 11*a* of the accommodation member 11 on the body side comprises a round seat section 87, a head section 88 protruding from one surface of the seat section 87, and a leg section 90 protruding from the other surface of the seat section 87 and having a pair of locking pieces 89 formed at the distal end thereof. As shown in FIG. 36, a total of 8 pin holes 91 for insertion of the leg section 90 of the pin 82 are formed in a zigzag arrangement with the same spacing as the hook mounting sections 85 at the long wall surface 11*a* of the accommodation member 11.

The pin holes 91 of the left 3 rows identify the number of steps in the cassette 3 attached thereto, and the pin holes 91 of the right 5 rows are provided to identify the cassette controller for controlling the cassette 3 attached thereto. Furthermore, the hook 81 is attached to the hook mounting section 85 of the cassette 3 corresponding to the pin hole 91 where the pin 82 has not been attached, but the hook 81 is not attached to the hook mounting section 85 of the cassette 3 corresponding to the pin hole 91 where the pin 82 was attached. As a result, the stage at which the cassette 3 is mounted and the cassette controller by which the cassette is controlled can be identified by the position of the hook 81 of the cassette 3 or the position of the pin 92 of the accommodation member 11 on the side of the body. Furthermore, in the configuration where the hook is attached to the hook mounting section 85 of the cassette 3 corresponding to the pin hole 91 where the pin 82 was attached, mounting is impossible. Therefore, erroneous mounting can be prevented.

Figure 39:
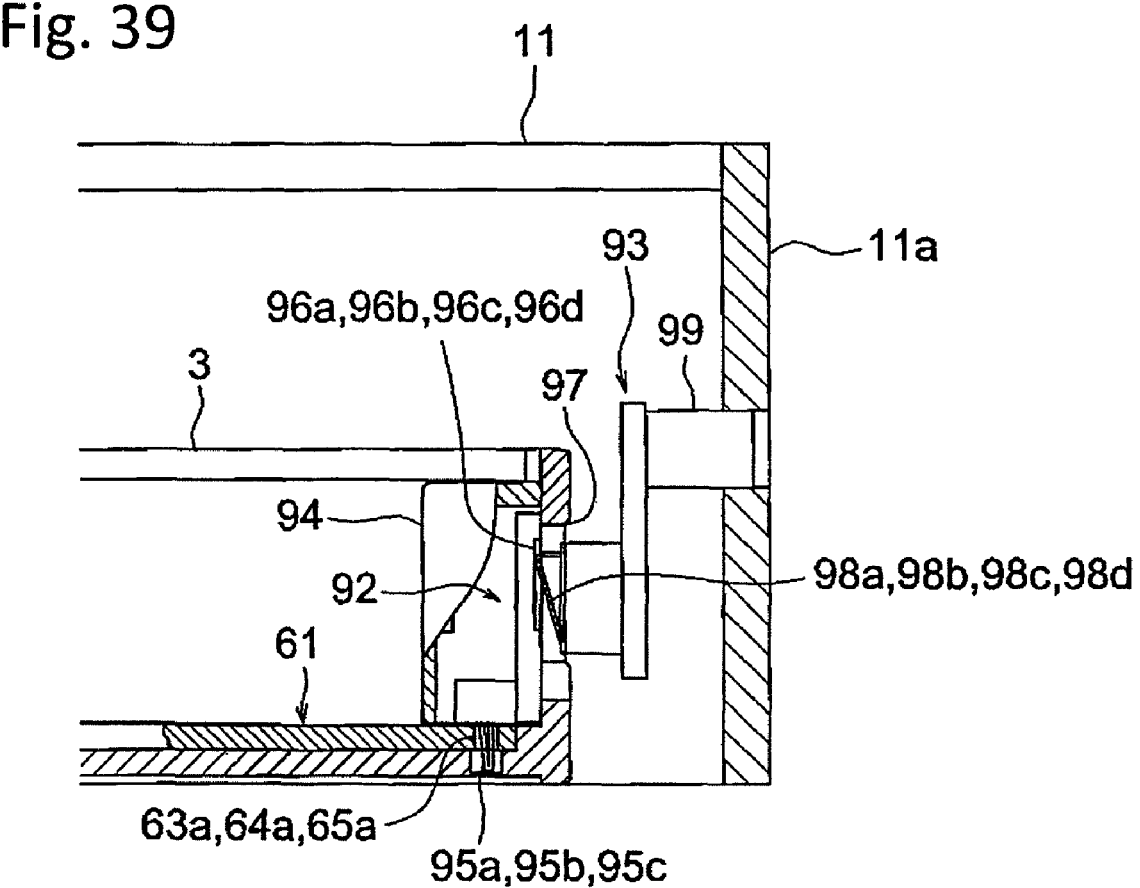
FIG. 39 is a cross-sectional view along the III-Ill line in FIG. 36.

In the present embodiment, as shown in FIG. 39, the slide resistance unit 61 provided inside the cassette 3 is electrically connected to the accommodation member 11 via the cassette connector 92 and shelf connector 93.

The cassette connector 92 is attached to the rear end wall of the cassette 3 and protected by the cover 94. First, second and third pins 95*a*, 95*b*, 95*c* are provided so as to protrude downward at the cassette connector 92, those pins to be inserted into respective through holes 63*a*, 64*a*, 65*a* of the plus-side conductor pattern 63, minus-side conductor pattern 64, and detection side conductor pattern 65 of the slide resistance unit 61. Furthermore, as shown in FIG. 35, the first, second, and third contact surfaces 96*a*, 96*b*, 96*c* made from Ni-plated sheets electrically connected to those pins 95*a*, 95*b*, 95*c*, respectively, and a fourth contact surface 96*d* for ON/OFF that is electrically connected to the second contact surface 96*b* are exposed rearward from a window 97 provided in the rear end wall of the cassette 3.

The shelf connector 93 is attached to the long wall surface 11*a* of the accommodation member 11 and has first, second, third and fourth contact sections 98*a*, 98*b*, 98*c*, 98*d* electrically connected respectively to the first, second, third, and fourth contact surfaces 96*a*, 96*b*, 96*c*, 96*c* of the cassette connector 92. Each of those contact sections 98*a*, 98*b*, 98*c*, 98*d* comprises a pair of linear members, is bent to assume a triangular shape, and impelled by a spring (not shown in the figure) so as to protrude from the shelf connector 93. Furthermore, the contact sections 98*a*, 98*b*, 98*c*, 98*d* are electrically connected to the contact pins (not shown in the figures) of the contact section 99 and wired to reach the prescribed position.

If the cassette 3 is accommodated in and attached to the accommodation member 11, the contact surfaces 96a, 96b, 96c, 96d of the cassette connector 92 and contact sections 98a, 98b, 98c, 98d of the shelf connector 93 are electrically connected, electric voltage is applied from the accommodation member 11, that is, from the shelf to the slide contact unit 61 of the cassette 3, and a voltage corresponding to the quantity of drug D inside the cassette 3 is detected as described above.

The invention claimed is:

1. A drug dispensing apparatus comprising a cassette for containing drugs in an aligned state, a rotor disposed at one open end of said cassette, a pushing unit for pushing said drugs toward said rotor, a drive mechanism for pivoting said rotor alternately between a dispensing position and a receiving position by operating a drive switch to dispense said drugs one by one, and a measuring unit for measuring the present quantity of said drugs in said cassette, characterized in that:
   a memory unit for storing a stock quantity $N_0$ of said drugs in said cassette is further provided; and
   wherein when said rotor is returned to the receiving position from the dispensing position, the present quantity N measured by the measuring unit is compared with the stock quantity $N_0$ stored in said memory unit, wherein if the present quantity N is less than the stock quantity $N_0$, the present quantity N is stored in said memory unit as a stock quantity $N_0$, while if the present quantity N is same as the stock quantity $N_0$, it is informed that said drug has been forgotten to take out.

2. The drug dispensing apparatus according to claim 1, wherein said measuring unit comprises:
   a constant voltage source;
   a resistance circuit comprising a plurality of resistors connected in series, in which the resistor at one end is connected to said constant voltage source and the resistor at the other end is connected to the ground;
   a detection circuit comprising a plurality of switches that are disposed with uniform spacing along said drugs and have one end thereof connected between the adjacent resistors and the other end thereof connected to a detection terminal;
   switch drive means provided at said pushing unit and serving to turn said switch on;
   measurement means for measuring a voltage in the detection terminal of said detection circuit; and
   computation means for computing the present quantity of the drugs based on the voltage measured by said measurement means.

3. The drug dispensing apparatus according to claim 2, wherein said detection circuit comprises three parallel circuits connected alternately to said switches.

4. The drug dispensing apparatus according to claim 2, wherein said switches are disposed equidistantly in the circumferential direction and the measurement of an elongated object in the form of a circular arc is made possible.

5. The drug dispensing apparatus according to claim 2, wherein
   said computation means
   computes the difference between a first measurement value obtained by said measurement means when a drug of a first reference length is disposed and a second measurement value obtained by said measurement means when a drug of a second reference length is disposed;
   computes the ratio of the difference between said first measurement value and second measurement value to the difference between said first reference length and second reference length; and
   computes the present quantity of the drugs to be measured, from the measurement value obtained by said measurement means when the drug is disposed and from said ratio.

6. The drug dispensing apparatus according to claim 3, wherein every other switch is removed.

7. The drug dispensing apparatus ct according to claim 1, wherein said measuring unit comprises:
   a constant voltage source;
   a resistance circuit comprising a linear resistor disposed along said drugs and having one end thereof connected to said constant voltage source and the other end thereof connected to the ground;
   a detection circuit comprising an electrically conductive sliding member disposed at said second reference member and having one end thereof in sliding contact with said resistor and the other end thereof connected to a detection terminal;
   measurement means for measuring a voltage in the detection terminal of said detection circuit; and
   computation means for computing the present quantity N of the drugs based on the voltage measured by said measurement means.

* * * * *